INVENTOR.
JOHN H. GALLICHOTTE
BY
Walter J. Madden Jr.

Jan. 12, 1960 J. H. GALLICHOTTE 2,920,823

ADDITION AND SUBTRACTION CIRCUIT UTILIZING ELECTRICAL DELAY LINES HAVING A SHORT-CIRCUIT TERMINATION

Filed Oct. 3, 1958 5 Sheets-Sheet 4

Jan. 12, 1960 J. H. GALLICHOTTE 2,920,823
ADDITION AND SUBTRACTION CIRCUIT UTILIZING ELECTRICAL DELAY LINES HAVING A SHORT-CIRCUIT TERMINATION
Filed Oct. 3, 1958 5 Sheets-Sheet 5

United States Patent Office 2,920,823
Patented Jan. 12, 1960

2,920,823

ADDITION AND SUBTRACTION CIRCUIT UTILIZING ELECTRICAL DELAY LINES HAVING A SHORT-CIRCUIT TERMINATION

John H. Gallichotte, Sunnyvale, Calif., assignor to International Business Machines Corporation, New York, N.Y., a corporation of New York Application October 3, 1958, Serial No. 765,253

16 Claims. (Cl. 235—173)

The present invention relates in general to arithmetic circuits and relates more particularly to arithmetic circuits utilizing delay lines.

The use of delay lines to perform arithmetic addition is disclosed in my copending application Serial No. 758,078, filed August 29, 1958, and the use of delay lines to perform arithmetic subtraction is disclosed in my copending application Serial No. 761,370, filed September 16, 1958, both assigned to the same assignee as the present application. In these applications, pulses are delayed in delay lines by amount proportional to the numbers involved in the addition or subtraction, and the total delay undergone by the pulses in the delay lines is then detected to provide a measure of the outcome of the arithmetic operation. The pulses may be additionally delayed in carry or borrow delay lines which are selectively connected to provide additional delays representing carries or borrows in the operation. For arithmetic operations based on a radix of ten, the master delay line was provided with nine separate sections and ten separate taps to represent the digits from 0 through 9, with a single tap representing only one digit.

In the present invention there is provided a multi-tap electrical delay line which is shorted at one end thereof so that the input pulse, after traveling the length of the delay line, is reflected at the shorted end and inverted in polarity before returning along the length of the delay line to the original input point. Assuming that the original input pulse has a positive polarity, the reflected pulse returning from the shorted end of the line will have a negative polarity. Thus, each tap of the delay line will receive a positive pulse during the travel of the pulse down the delay line, and a negative pulse during the return of the reflected pulse from the shorted end of the delay line.

In one form of the present invention, there is provided an electrical delay line having four and one-half delay units therein and having five taps thereon. This delay line is shorted at its end and receives an input pulse which travels along the length of the line with a positive polarity. The pulses occurring at the different taps as the positive pulse travels along the line correspond to the digits from 0 through 4. Upon reaching the shorted end of the delay line, the pulse is reflected and returns along the length of the delay line with a negative polarity. As this negative pulse passes the five taps of the delay line, the pulses occurring at the different taps correspond to the digits 5 through 9. By means of suitable polarity sensing circuits or devices, the polarity of the pulses at the different taps may be detected to determine which of the two possible digits is represented by a given pulse. In addition to the polarity sensing circuitry, switching means are provided for controlling the selection of the pulse of proper polarity. This switch means will have one position when the digits 0 through 4 are to be utilized, representing a pulse of positive polarity in the delay line, and will have the opposite position when the digits 5 through 9 are to be utilized, representing the reflected negative polarity pulse on the delay line. This switching means controls the polarity sensing circuitry so that only the pulse of proper polarity is detected in the arithmetic operation.

By virtue of using the reflected pulse in the manner described above, the length of the delay line utilized need only be half that required for systems in which a separate section and tap of the delay line are provided for each digit. Further, the present system reduces the number of switches required for selection of the digits in the arithmetic operations, since a single switch represents two digits, i.e., 0–9, 1–8, 2–7, etc. A further advantage of the present invention results from the fact that for any given tap on the delay line, one of the digits represented by that tap corresponds to the nines complement of the other digit represented. Thus, the delay line and circuitry of the present invention may be utilized for the nines complement method of subtraction, in which the nines complement of the minuend digit is added to the subtrahend digit to produce either the nines complement of the difference or the nines complement of the difference plus ten. To permit the performing of both addition and subtraction in the apparatus of the present invention there is provided a selection switch which has one position for addition, in which the pulse representing the digit itself is utilized, and has another position for subtraction, in which the pulse representing the nines complement of the minuend digit is utilized. Thus, the delay line and associated circuitry of the present invention may be utilized for both addition and subtraction, without requiring the reconnection or relabeling of any of the switches or delay lines.

It is therefore an object of the present invention to provide improved apparatus for performing arithmetic operations by means of delay lines.

It is a further object of this invention to provide apparatus for performing arithmetic operations by means of delay lines in which a given delay line has pulses of one polarity to represent a predetermined group of digits and has pulses of the opposite polarity to represent another predetermined group of digits.

It is a further object of the present invention to provide apparatus for performing arithmetic operations by means of electrical delay lines in which an electrical delay line has a pulse of one polarity therein to represent one group of digits and has a pulse of the opposite polarity to represent another group of digits, and means are provided for detecting the polarity of the pulse to determine the particular group to which the pulse corresponds.

It is a further object of the present invention to provide improved apparatus for performing arithmetic operations by means of electrical delay lines in which both addition and subtraction may be performed by means of the same apparatus.

It is an additional object of this invention to provide apparatus for performing arithmetic operations by means of electrical delay lines in which pulses of one polarity in the delay line represent one group of digits and pulses of the opposite polarity represent another group of digits, and both addition and subtraction may be performed by means of the same apparatus.

Other objects of the invention will be pointed out in the following description and claims and illustrated in the accompanying drawings which disclose, by way of example, the principle of the invention and the best mode which has been contemplated of applying that principle.

Figure 3A:
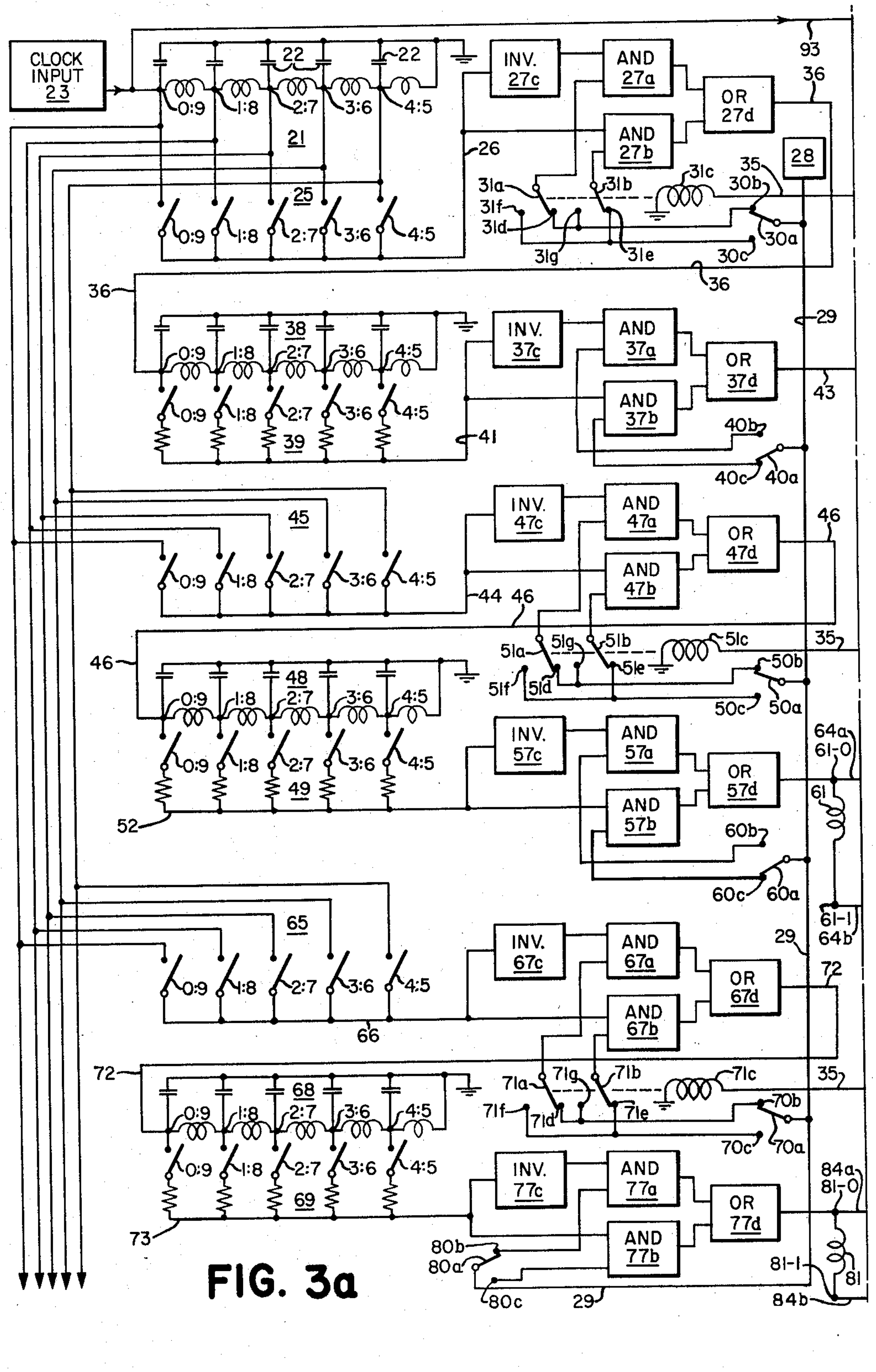
Figs. 3*a*, 3*b* and 3*c*, when laid side-by-side, illustrate apparatus in accordance with the present invention for performing both addition and subtraction in three orders.

Referring to Fig. 3*a*, by character of reference, numeral 21 designates the master delay line of the present invention. Delay line 21 has four and one-half sections, the four sections being equal in length of delay and the half section having a delay corresponding to half that of the other four sections. Line 21 is provided with five taps thereon labeled 21–0:9, 21–1:8, 21–2:7, 21–3:6, and 21–4:5, representing equal increments of delay along the line. Delay line 21 is shorted at one end, as represented by capacitors 22 and the associated circuitry, so that a pulse traveling down the line from the other end is reflected at the shorted end and inverted in polarity and returned down the length of the delay line. Delay line 21 receives an input pulse from a suitable device such as an input clock 23.

Assuming a pulse from clock 23 has a positive polarity, this positive pulse reaches tap 21–0:9 at "0" time, tap 21–1:8 after one unit of delay, tap 21–2:7 after two units of delay, tap 21–3:6 after three units of delay, tap 21–4:5 after four units of delay, and reaches the shorted end of the delay line after four and one-half units of delay. Upon reaching the shorted end, this positive pulse is inverted in polarity and reflected backward down the line 21 where it reaches tap 21–4:5 at a time corresponding to five units of delay from the time of the input of the positive pulse from clock 23. The inverted pulse then continues on down line 21 and reaches tap 21–3:6 after six units of delay, tap 21–2:7 after seven units of delay, tap 21–1:8 after eight units of delay and tap 21–0:9 after nine units of delay. Thus, it will be seen that in delay line 21 the digits 0 through 4 may be represented by positive pulses on the tape 21–0:9 through 21–4:5, respectively, and the digits 5 through 9 may be represented on the same delay line and on the same taps by negative pulses at taps 21–4:5 through 21–0:9, respectively. A given tap on delay line 21 thus has two pulses appearing thereon, one a positive pulse during the travel of the pulse down delay line 21 to the shorted end, and the other a negative pulse occurring during the return of the reflected pulse from the shorted end of the delay line.

In the embodiment illustrated in the drawings, the apparatus is operable to perform either addition or subtraction, and such addition or subtraction may be performed in three orders, i.e., units, tens and hundreds. The apparatus of the present invention operates to produce a true sum or difference in only two cycles of clock 23. On the first cycle the sums or differences and the carries or borrows themselves are generated. The carries or borrows may or may not be entered in the sums or differences on the first cycle, depending upon the relative times of occurrence of the sums or differences and the carries or borrows. On the second and all subsequent cycles, the carries or borrows which were generated but not entered in the first cycle are entered into the first cycle sums or differences to produce true sums or differences taking into account the effects of carries or borrows. To provide for selection of the different digits to be utilized in the arithmetic operations, suitable switching means are provided for selecting the appropriate taps of the delay line elements. For the units order in either subtraction or addition there is provided a minuend-augend selection switch bank 25 having a plurality of switches 25–0:9, 25–1:8, 25–2:7, 25–3:6 and 25–4:5. One terminal of each of these switches is connected to the corresponding tap on delay line 21 and the other terminals of these switches are connected in common to a conductor 26.

The output pulse on conductor 26 is supplied to suitable means for selecting the pulse of proper polarity in accordance with the digit represented by the closed one of switches 25. Such polarity selection means may include a pair of AND gates **27*a* and 27*b*. The pulse from conductor 26 is supplied directly to AND gate 27*b* as one input thereof, and is supplied to AND gate 27*a* through an inverter device 27*c* which inverts the polarity of the pulses on conductor 26 before supplying them as an input to AND gate 27*a*. AND gates 27*a* and 27*b* are of the type which produce an output signal upon the simultaneous appearance of positive signals on their respective two input leads. The other inputs to AND gates 27*a* and 27*b*** are supplied through suitable switching means which determine the polarity of the pulse to be selected, depending upon the particular digit represented and also depending upon whether the operation to be performed is addition or subtraction.

To control the selection of the pulse of proper polarity, there is provided a "digit group" selection switch 30 having a contact arm **30*a* which is movable between a contact 30*b* and a contact 30*c*. Contact 30*b* represents the digits between 5 and 9, while contact 30*c* represents the digits between 0 and 4. Arm 30*a* is connected to a suitable source 28 for supplying an input signal to AND gates 27*a* and 27*b*, and this signal is supplied through a conductor 29 and the closed one of contacts 30*b* or 30*c* to the contacts of one section 31 of an "add-subtract" selection switch. Switch 31 is illustrated as being a double-pole, double-throw switch having a pair of contact arms 31*a* and 31*b* which are controlled by an energizing coil 31*c*. In the "add" position illustrated in the drawing, arm 31*a* engages a contact 31*d* to connect the source 28 as one input to AND gate 27*a* through conductor 29, switch arm 30*a* and contact 30*b*, if the digit is in the group from 5 to 9. Also in the "add" position, arm 31*b* engages a contact 31*e* to connect source 28 as one input to AND gate 27*b* through conductor 29, switch arm 30*a* and contact 30*c* for the digits from 0 to 4. In the "subtract" position, the above recited connections to gates 27*a*, 27*b* are severed, since arm 31*a* engages a contact 31*f* which is connected to contact 30*c*, while arm 31*b* engages a contact 31*g* which is connected to contact 30*b***.

The energization of coil **31*c* is controlled by means of a master add-subtract selection switch 32** (Fig. 3*b*) having an arm **32*a* which is movable to engage either one of contacts 32*b* or 32*c*. When engaging contact 32*b* in the "add" position, arm 32*a* connects a source of current, represented by a conductor 34, to coil 31*c* through a conductor 35. Conductor 35 also serves to energize other sections of the add-subtract selection switch to be described below. When arm 32*a* engages contact 32*c*, corresponding to the "subtract" position, conductor 35 is disconnected from source 34**.

The outputs from AND gates **27*a* and 27*b* are supplied as the inputs to an OR gate 27*d* which is operable to produce an output signal whenever either its input conductors are energized. This output signal from OR gate 27*d* is supplied through a conductor 36 to the input of an addend-subtrahend delay line 38 for the units order. Delay line 38 is similar to delay line 21 in having four and one-half sections of delay, and is provided with taps 38–0:9, 38–1:8, 38–2:7, 38–3:6 and 38–4:5 equally spaced in time along the delay line. Each of these taps of delay line 38 is connected to the corresponding terminal of an addend-subtrahend selection switch 39–0:9, 39–1:8, 39–2:7, 39–3:6, and 39–4:5. The other terminals of switches 39 are connected in common to a conductor 41 which leads to the parallel inputs of an AND gate 37*b* and an inverter 37*c*. Inverter 37*c* supplies an output pulse to an AND gate 37*a*, and the outputs of AND gates 37*a* and 37*b* are supplied through an OR gate 37*d* to a conductor 43 which leads to the units sum-difference determining apparatus, as will be described more fully below. The other inputs to AND gates 37*a* and 37*b* are supplied from source 28 through the contact 40*b* and 40*c*** of a digit group selection switch 40. Switch 40 has an arm 40*a* which engages contact 40*b* to represent the digits from 5 to 9, and engages contact 40*c* to represent the digits from 0 to 4.

Thus, in the units order a pulse from clock 23 travels through master delay line 21 to the tap thereof corresponding to the closed one of augend-minuend selection switches 25, then through the closed switch to conductor 26 and the parallel inputs of AND gate 27*b* and inverter 27*c*. The pulse will pass through whichever one of AND gates 27*a* and 27*b* receives an additional input through switches 30 and 31, and the output from the actuated AND gate will pass through OR gate 27*d* to conductor 36 and the input of addend-subtrahend delay line 38. The pulse then passes through addend-subtrahend delay line 38 to the tap thereof corresponding to the closed addend-subtrahend selection switch 39, and then through this closed switch to conductor 41 and AND gates 37*a* and 37*b*. The pulse will pass through the one of these AND gates which receives another input from source 28 through digit group selection switch 40. The pulse then passes through OR gate 37*d* to the units sum-difference conductor 43.

To illustrate more clearly the operation of the present invention, and considering only the portion of the apparatus described thus far, assume that an addend of 6 is to be added to an augend of 3 in the units order of the apparatus. To enter the augend digit of 3, switch 25–3:6 is closed, and to enter the addend digit of 6, switch 39–3:6 is closed. In addition to closing the selected augend-minuend selection switch 25 and the selected addend-subtrahend switch 39, switch arm 30*a* is moved to engage contact 30*c*, representing the augend digits from 0 to 4, and switch arm 40*a* is moved to engage contact 40*b*, representing the addend digits from 5 to 9. Similarly, the master add-subtract selection switch 32 (Fig. 3*b*) will be placed in the "add" position shown in the drawing, in which arm 32*a* connects source 34 to conductor 35 through contact 32*b*. This energizes coil 31*c* of selection switch 31 to place this switch in the "add" position shown, thus closing contacts 31*d* and 31*e*, so that the signal from source 28 is supplied through arm 30*a*, contact 30*c*, contact 31*e* and arm 31*b* to AND gate 27*b*.

A positive pulse from clock 23 travels down line 21 until it reaches tap 21–3:6 and closed switch 25–3:6, at which time the pulse has undergone three units of delay. A portion of the positive pulse then flows through this closed switch to conductor 26 and the parallel inputs to AND gate 27*b* and inverter 27*c*. It will be seen that AND gate 27*a* does not receive an input from source 28, since contact 30*b* is open so that this gate does not fire. However, gate 27*b* does have an input thereon from source 28 through conductor 29, arm 30*a*, contact 30*c*, contact 31*e*, and arm 31*b*, so that when the pulse from conductor 26, after having been delayed three units of delay in line 21 arrives at gate 27*b* it causes this gate to operate, thus producing an output pulse which is passed through OR gate 27*d* to conductor 36 and the input of delay line 38.

The pulse then passes through delay line 38 until it reaches tap 38–3:6 thereof, after undergoing three units of delay in line 38. A portion of this positive pulse will flow through closed switch 39–3:6 to the inputs of inverter 37*c* and AND gate 37*b*. However, AND gate 37*b* does not have another input thereon, since selection switch 40 is in the position to close contact 40*b* and open contact 40*c*, corresponding to the group of digits from 5 to 9, so that gate 37*b* does not fire at this time. Similarly, the positive pulse received by inverter 37*c* is inverted and supplied as a negative pulse to AND gate 37*a*, but since AND gate 37*a* operates only on positive inputs, this negative input appearing at tap 38–3:6 in ineffective to actuate the gate. Thus, the positive pulse appearing at tap 38–3:6 is ineffective to produce an output pulse from either of gates 37*a* and 37*b* at this time.

The positive pulse thus continues on down delay line 38 until it reaches the shorted ends thereof, at which time it is inverted in polarity and reflected back along line 38. When the reflected negative pulse reaches tap 38–3:6, after undergoing a total of six units of delay since the pulse entered line 38, a portion of it again flows through closed switch 39–3:6 to inverter 37*c* and AND gate 37*b*. AND gate 37*b* is again inoperative, since it does not receive an input from source 28 through switch 40, as discussed above. However, the negative pulse arriving at inverter 37*c* is inverted to a positive pulse and supplied as a positive input to AND gate 37*a*. Since AND gate 37*a* receives another positive input signal from source 28 through contact 40*b* of switch 40, AND gate 37*a* operates at this time to produce a positive output pulse through OR gate 37*d* to the summing conductor 43. The pulse on conductor 43 has thus been delayed three units in the augend section and an additional six units in the addend section for a total delay of nine units, representing the sum of the augend and addend digits.

Thus, in accordance with the present invention, a pulse is delayed in each of the addend and augend sections by amounts proportional to the digits involved in the addition. The pulse of proper polarity is selected by means of the add-subtract switch and the digit group selection switch, so that only the pulse representing the desired digit is utilized. It will be noted that when switch 31 is moved to subtract position, the polarities of the pulses which operate gates 27*a* and 27*b* are effectively reversed, to provide for the nines complement method of subtraction to be described more fully below.

For the tens order there is provided a tens order augend-minuend selection switch bank 45 having a plurality of switches 45–0:9 through 45–4:5. One terminal of each of these switches is connected to the corresponding tap on delay line 21, in parallel with the switches of the units order augend-minuend selection switch bank 25. The other terminals of switches 45–0:9 through 45–4:5 are connected in common to a conductor 44 which leads to the parallel inputs of an inverter 47*c* and an AND network 47*b*. The output from inverter 47*c* is supplied as one input to an AND gate 47*a* which receives another input through the contact arm 51*a* of another section 51 of the master add-subtract selection switch. Switch 51 has an energizing coil 51*c* connected to conductor 35 and has another arm 51*b* and additional contacts 51*d*, 51*e*, 51*f* and 51*g* for controlling the connection of the input from source 28 to AND gates 47*a* and 47*b*. A digit group selection switch 50 has an arm 50*a* which engages a contact 50*b* for the digits from 5 to 9 and engages another contact 50*c* for the digits from 0 to 4.

The outputs from AND gates 47*a* and 47*b* are supplied through a conductor 46 to the input of an addend-subtrahend delay line 48 having taps 48–0:9, 48–1:8, 48–2:7, 48–3:6 and 48–4:5. These taps are connected to respective terminals of corresponding switches 49–0:9, 49–1:8, 49–2:7, 49–3:6 and 49–4:5. The other terminals of these switches are connected in common to a conductor 52 which leads to the parallel inputs of an inverter 57*c* and an AND gate 57*b*. The ouput from inverter 57*c* is supplied as one input to an AND gate 57*a*. The other inputs to AND gates 57*a* and 57*b* are supplied from source 28 through a digit group selection switch 60 having an arm 60*a* and a pair of contacts 60*b* and 60*c*. The output from gates 57*a* and 57*b* are supplied through an OR gate 57*d* to the input of a tens order carry-borrow delay line 61. In the case of either addition or subtraction, line 61 needs only one delay section corresponding to a delay of one section in master delay line 21. Carry-borrow delay line 61 may thus have a pair of output taps 61–0 and 61–1.

Figure 3B:
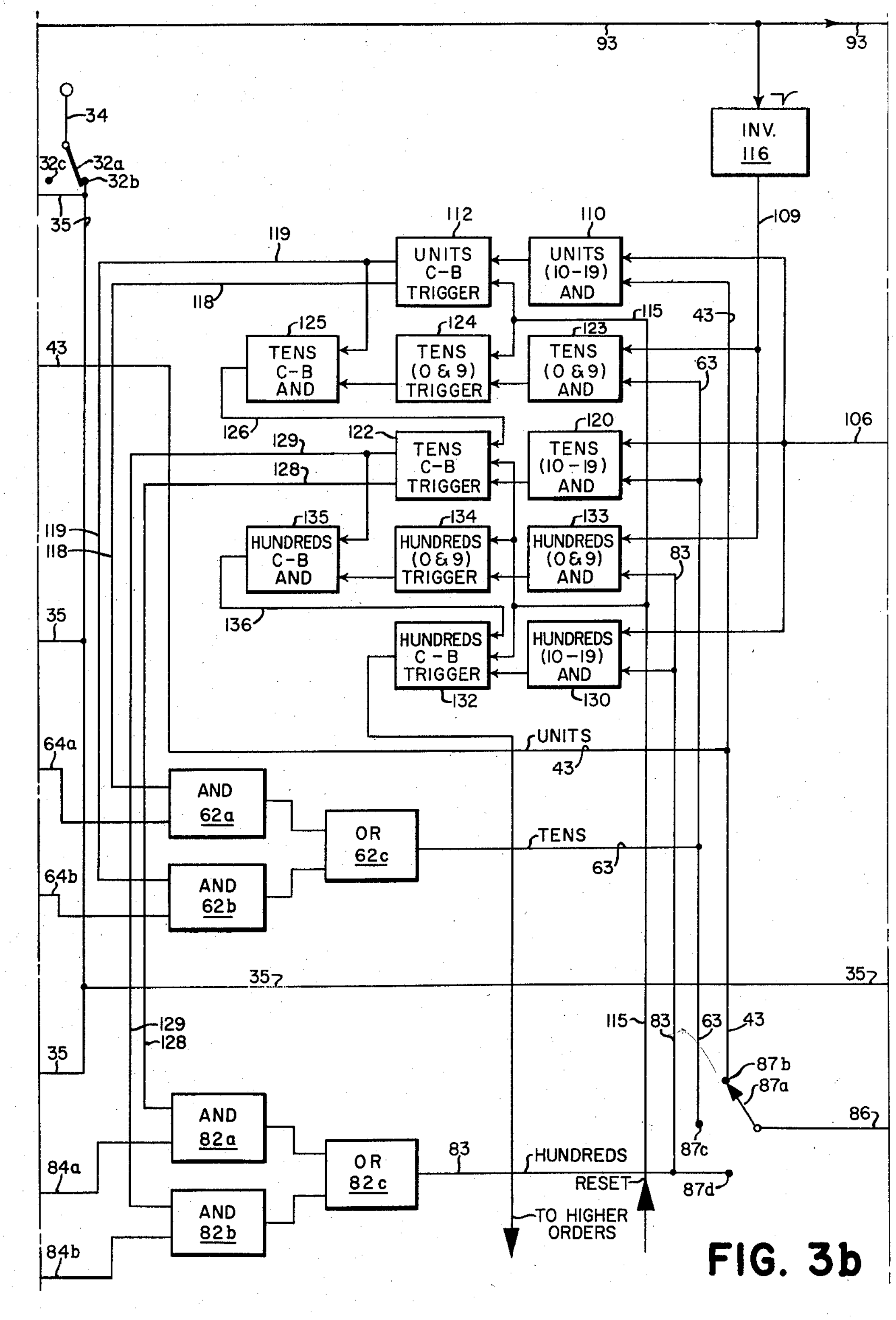

The connections to the output taps of carry-borrow delay line 61 are controlled by suitable means, such as a pair of AND gates 62*a* and 62*b* (Fig. 3*b*). AND gate 62*a* has one input connected to tap 61–0 through a conductor 64*a* and has its other input connected to a trigger circuit to be described below. When signals appear on both inputs to gate 62*a*, the gate is opened to supply a pulse through an OR gate 62*c* to a tens sum-difference conductor 63. AND gate 62*b* has one input connected to tap 61–1 through a conductor 64*b* and has its other input connected to a trigger circuit to be described, so that a pulse is supplied through OR gate 62*c* to conductor 63 when two input signals appear on gate 62*b*. With gate 62*a* open, the output of gate 57*d* is effectively connected through tap 61–0, conductor 64*a* and gate 62*a* directly to conductor 63 leading to the summing or difference circuits, so that the pulse from gate 57*d* undergoes no delay in carry-borrow delay line 61. When gate 62*a* is closed and gate 62*b* is open, gate 57*d* is effectively connected to conductor 63 through tap 61–1 and conductor 64*b*, so that the pulse from gate 57*d* undergoes a delay of one unit in the carry-borrow delay line 61.

For the hundreds order numbers there is provided an augend-minuend selection switch bank 65 (Fig. 3*a*) having switches 65–0:9 through 65–4:5 which have one terminal connected to the corresponding taps on master delay line 21, in parallel with selection switches 25 and 45 for the units and tens orders. The other terminals of switches 65–0:9 through 65–4:5 are connected in common to a conductor 66 which is connected to the parallel inputs of an inverter 67*c* and an AND network 67*b*. The energization of AND gates 67*a* and 67*b* is controlled through a digit group selection switch 70 having a switch arm 70*a* which engages either a contact 70*b*, corresponding to digits from 5 to 9, or a contact 70*c* corresponding to the digits from 0 to 4. Similarly, a section 71 of the add-subtract selection switch is provided to control the second input to AND gates 67*a* and 67*b*, in a manner similar to that described above for the tens and units orders.

The outputs from AND gates 67*a* and 67*b* are supplied through an OR gate 67*d* to a conductor 72 and the input of a hundreds order addend-subtrahend delay line 68. Delay line 68 has taps 68–0:9 through 68–4:5 corresponding to the delay sections therein. An addend-subtrahend selection switch bank 69 has switches 69–0:9 through 69–4:5 therein, with one terminal of each of the switches connected to the corresponding tap of addend-subtrahend delay line 68. The other terminals of switches 69 are connected in common to a conductor 73 which leads to the parallel inputs of an inverter 77*c* and an AND gate 77*b*. Inverter 77*c* is connected to the input of an AND gate 77*a*, and the outputs of AND gates 77*a* and 77*b* are supplied to an OR gate 77*d*. The energization of the other inputs to gates 77*a*, and 77*b* from source 28 is controlled through a digit group selection switch 80 having an arm 80*a* and a pair of contacts 80*b* and 80*c*, in a manner similar to that described above in connection with switches 40 and 60.

The output of OR gate 77*d* is supplied to the input of a hundreds order carry-borrow delay line 81. Carry-borrow delay line 81, like the tens order carry-borrow delay line 61, has two taps 81–0 and 81–1, and the connection of these taps to a sum-difference conductor 83 is controlled by a pair of AND gates 82*a* and 82*b* and an OR gate 82*c*. Gate 82*a* receives one input from tap 81–0 through a conductor 84*a* and receives another input from a trigger circuit to be described below, while gate 82*b* receives one input from tap 81–1 through a conductor 84*b* and receives another input from a trigger circuit to be described. Thus, when gate 82*a* is open, the pulse from OR gate 77*d* effectively by-passes carry-borrow delay line 81 with no delay, and when gate 82*a* is closed and gate 82*b* is open, the pulse undergoes a delay of one unit in delay line 81.

From the description of the apparatus thus far it will be seen that there is provided a master delay line 21 through which the master input pulse from clock 23 travels. This pulse also travels in parallel through the different delay line taps to the closed augend-minuend selection switches 25, 45 and 65 of the units, tens and hundreds orders, and then through the corresponding addend-subtrahend delay lines 38, 48 and 68 and the closed addend-subtrahend selection switches 39, 49 and 69. Thus, the pulses arriving at the outputs of OR gates 37*d*, 57*d* and 77*d* will have been delayed by amounts corresponding to the respective sums of the delays in the units, tens and hundreds orders augend-minuend and addend-subtrahend sections. In the case of the tens and hundreds orders, the pulses may undergo additional delays in carry delay lines 61 and 81, depending upon the conditions of AND gates 62*a*, 62*b*, 82*a* and 82*b*.

Figure 3C:
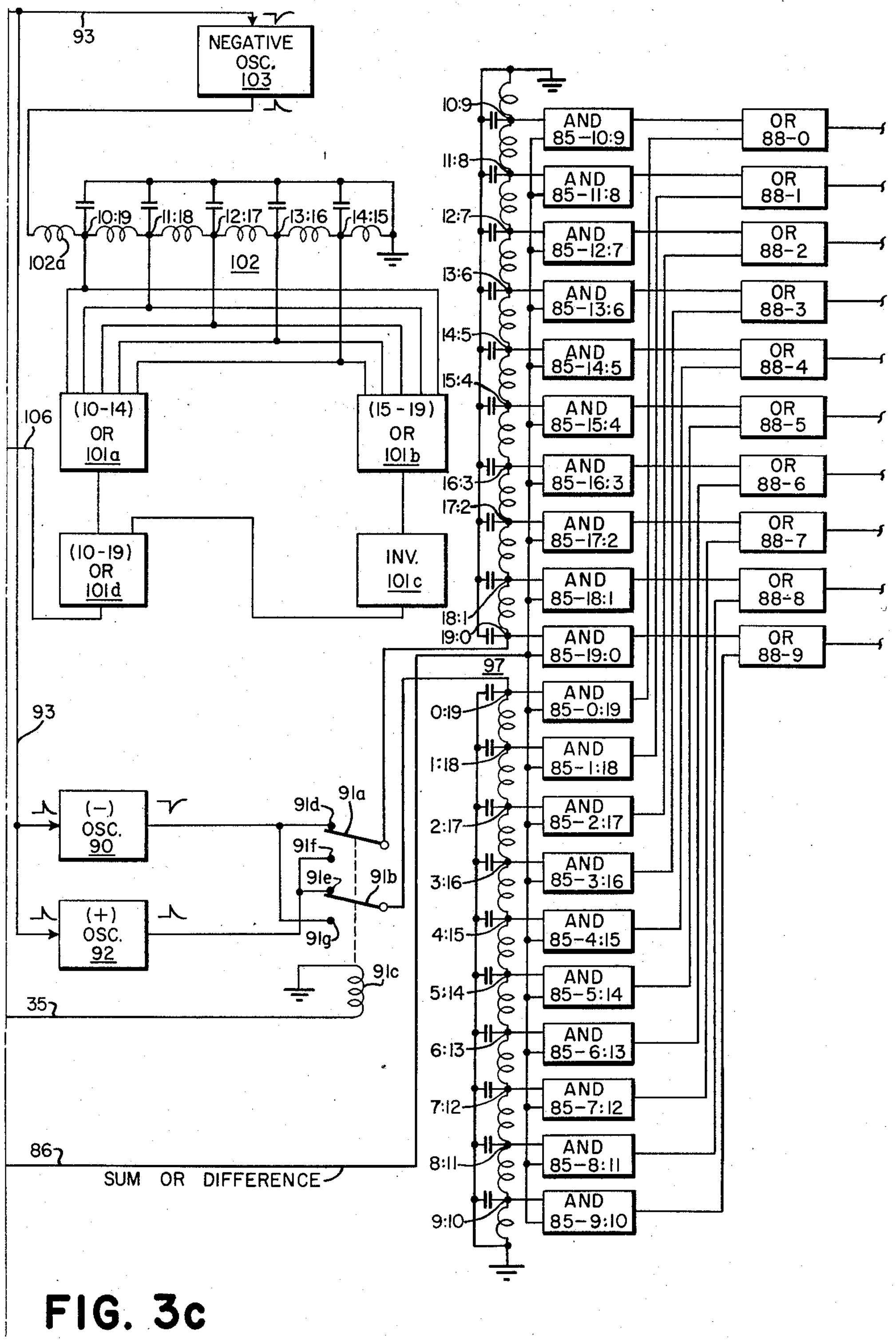

To understand how a measure of the sums or differences represented by the pulses appearing from OR gates 37*d*, 57*d* and 77*d* is obtained, reference may be had to Figs. 3*b* and 3*c*. For detecting the delay undergone by the pulses in the different sections of the adding and subtracting apparatus of the present invention, there are provided a plurality of coincidence detection circuits shown as AND gates 85 (Fig. 3*c*). AND circuits 85 may be of any suitable type in which the simultaneous appearance of positive pulses on the two inputs thereof produces an output pulse from the device.

One input to each of AND gates 85 is supplied in common from a conductor 86 which has supplied thereto a signal representing the pulse whose delay time is to be determined. In the example embodiment illustrated, the different sums or differences are adapted to be read out serially by order, that is, the units sum or difference is read first, then the tens sum or difference and then the hundreds sum or difference. However, it will be understood that the sums or differences may be read out in any desired order, or may be read out simultaneously. In the present case, conductor 86 may be connected by means of the arm 87*a* of a switch 87 (Fig. 3*b*) to a contact 87*b* which is connected to conductor 43 of the units sum or difference, to thus connect conductor 43 to conductor 86 and coincidence circuits 85.

Switch arm 87*a* may be moved to engage a contact 87*c* to connect conductor 63 of the tens orders sum or difference to conductor 86 and coincidence circuits 85. Switch arm 87*a* is also movable to engage a contact 87*d* which is connected to conductor 83 of the hundreds order sum or difference to connect this conductor to conductor 86 and coincidence circuits 85. Switch 87 may be of any suitable type, such as a manual switch, but preferably it is a high speed mechanical or electrical switching means which operates to sequentially connect the sum and difference conductors 43, 63 and 83 to the coincidence circuits. In general, the switching speed should be slower than the clock rate so that there is at least one sum or difference signal during the time switch 87 remains in any one position.

The sum pulses from each of the conductors 43, 63 and 83 are sequentially supplied to all the coincidence circuits 85 where they are compared in time with a measure of the master pulse from clock 23. To obtain the measure of the master pulse time there is provided a pair of blocking oscillators 90 and 92 (Fig. 3*c*). Oscillator 90 produces a negative output pulse and oscillator 92 produces a positive output pulse. The input to oscillators 90 and 92 is supplied in common from a conductor 93 which is connected to the output of clock 23 and tap 21–0:9 of master delay line 21. Conductor 93 thus receives a positive pulse at the start of each cycle of clock 23 and this pulse on conductor 93 causes the oscillators 90 and 92 to fire at this time.

The output signals from oscillators 90 and 92 are supplied through a section 91 of the add-subtract selection switch to the inputs of separate sections of a delay line 97. Switch 91 has an energizing coil 91*c* which is connected to conductor 35, a pair of switch arms 91*a*, 91*b* and contacts 91*d*, 91*e*, 91*f* and 91*g*. Delay line 97 has one group of delay sections comprising the sections represented by taps 97–0:19, 97–1:18, 97–2:17, 97–3:16, 97–

4:15, 97–5:14, 97–6:13, 97–7:12, 97–8:11 and 97–9:10. Delay line 97 also has another group of sections represented by the taps 97–19:0, 97–18:1, 97–17:2, 97–16:3, 97–15:4, 97–14:5, 97–13.6, 97–12:7, 97–11:8 and 97–10:9. Each of the above recited taps of the two groups of sections of delay line 97 is connected to the input of the correspondingly numbered one of coincidence AND gates 85.

In the numbering of AND gates 85 and the taps of delay line 97, the first number or digit following the hyphen designates the number or digit represented by that particular tap and AND gate for addition operations, and the second number or digit, i.e., the one following the colon, designates the number or digit represented by that particular tap and AND gate for subtraction operations. For example, tap 97–2:17 and AND gate 85–2:17 represent the digit "2" for addition operations and represent the number "17" for subtraction operations, and tap 97–13:6 and AND gate 85–13:6 represent the number "13" for addition operations and represent the digit "6" for subtraction operations. It will be understood that the number or digit designations for both addition and subtraction operations correspond to "real" time as measured by clock 23, and that the number or digit designations for subtraction operations are converted to either the nines complement of "real" time, in the case of taps 97–19:0 through 97–10:9 or the nines complement of "real" time plus ten, in the case of taps 97–0:19 through 97–9:10, so as to produce a measure of the difference between the minuend and subtrahend digits.

Both of the groups of sections of delay line 97 are shorted at their respective ends so that pulses travel down the separate groups of sections to the ends thereof and are reflected back down the line with inverted polarities, in a manner similar to the previously described delay lines. It will be noted that both groups of sections of delay line 97 are nine and one-half units long so that a pulse undergoes nine and one-half units of delay in traversing the group in one direction with one polarity and an additional nine and one-half units of delay in returning with the opposite polarity, resulting in a total delay in each group of nineteen units.

When switch 91 is in the "add" position shown in the drawing, the positive output pulse from oscillator 92 is connected through contact 91*e* and arm 91*b* to the tap 97–0:19, representing the input to that group of sections of delay line 97. Since oscillator 92 is fired at "0" time by the pulse from clock 23 through conductor 93, the arrival of the positive pulse from osicillator 92 at tap 97–0:19 occurs at "0" time. This positive pulse thus continues down to taps 97–1:18, 97–2:17, 97–3:16, etc., arriving at these different taps at "real" times corresponding to the digit designations of these taps, as discussed above. Since each of these taps is connected to one input of a corresponding AND gate 85, gates 85 each receive a positive input pulse at a "real" time corresponding to their first digit designation. That is, gate 85–0:19 receives an input from tap 97–0:19 at "0" time, gate 85–2:17 receives an input from tap 97–2:17 at "2" time, etc. Thus, since the pulses whose delay times are to be determined are supplied as inputs to all of gates 85 through conductor 86 and switch 87, coincidence will occur in the particular gate 85 which also receives an input from the associated tap of line 97. It will be seen that such coincidence will occur in one, and only one, of gates 85 for a given pulse on conductor 86, and that this coincidence will occur in the particular gate 85 representing the delay time of this pulse on conductor 86.

Upon reaching the end of this portion of delay line 97, after undergoing nine and one-half units of delay and after providing pulses representing the times from "0" time through "9" time, the positive pulse from oscillator 92 is inverted in polarity and reflected back down the delay line. However, since the pulse is now negative and AND gates 85 accept only positive input pulses, the negative pulse is ineffective to operate gates 85 during its return on line 97.

Next considering oscillator 90 in the case of addition, it is also fired at "0" time by the pulse on conductor 93 from clock 23. The negative output pulse from oscillator 90 is supplied through contact 91*d* and arm 91*a* to tap 97–19:0, representing the input to the other group of sections of delay line 97. However, since this pulse is negative, it is ineffective to actuate any of the associated gates 85 as it travels from tap 97–19:0 to tap 97–10:9 and the end of the delay line. Upon reaching the end of the line, after undergoing nine and one-half units of delay, the pulse is inverted to a positive pulse and reflected back down the line. It thus arrives as a positive pulse at tap 97–10:9 at "10" time and a portion of it is supplied to AND gate 85–10:9 at this time. The positive pulse in line 97 then continues to taps 97–11:8, 97–12:7, etc. to produce at these taps a series of positive pulses representing the times from "10" time through "19" time. These positive pulses are supplied as inputs to the associated coincidence AND gates 85 where they are utilized to detect the delay times of the sum or difference pulses on conductor 86, in a manner similar to that described above for the "0" time to "9" time pulses.

For subtraction operations, switch 91 is in the position opposite to that shown in the drawings. In the subtraction position, the positive output pulse from oscillator 92 is supplied through contact 91*f* and arm 91*a* to tap 97–19:0. The positive pulse thus travels sequentially past taps 97–19:0, 97–18:1, 97–17:2., etc. to provide positive input pulses to the associated AND gates 85 at the "real" times from "0" time through "9" time. Upon reaching the end of that group of sections of line 97, the pulse is reflected back with a negative polarity and hence is ineffective to actuate any of the AND gates 85 on its return trip.

Also, in the "subtract" position, the negative output pulse from oscillator 90 is supplied through contact 91*g* and arm 91*b* to tap 97–0:19. This negative pulse thus travels sequentially from tap 97–0:19 to taps 97–1:18, 97–2:17, etc., but it is ineffective to actuate any of the associated gates 85. The negative pulse thus reaches the end of this group of sections of delay line 97 after nine and one-half units of delay and is reflected back with a positive polarity. The positive pulse thus reaches tap 97–9:10 at "10" time, tap 97–8:11 at "11" time, etc. These positive pulses thus provide positive inputs to the associated AND gates at the respective times indicated.

Summarizing the operation of delay line 97 and AND gates 85, the pulses on conductors 43, 63 and 83 are sequentially applied to all the coincidence circuits 85, but coincidence occurs only in the particular coincidence circuit which also has as the other input thereof a pulse coincidence in time from the delay line 97. The particular coincidence circuit which has the two simultaneous inputs produces an output pulse which is supplied to suitable utilization apparatus, such as a visual indicating mechanism or some type of an output device which prints or otherwise produces a record of the sum or difference obtained.

To provide digitization of the sum and difference and also to provide for conversion of the sum of the subtrahend digit and the nines complement of the minuend digit to a digit representing the difference between the minuend and the subtrahend, there is provided a plurality of OR gates 88–0 through 88–9. These OR gates 88 each receive two inputs from AND gates 85. In the case of addition, it will be seen that each OR gate receives inputs from the associated pair of AND gates 85. That is, OR gate 88–0 receives inputs from AND gates 85–0:19 and 85–10:4, so that OR gate 88–0 produces an output indicating the digit zero for a sum of either zero or ten. Similarly, for example, OR gate 88–6 receives inputs from both of AND gates 85–6:13 and 85–16:3 to produce an output indicating the digit six for a sum of either six or sixteen. For subtraction, it will be seen that the two inputs to each of OR gates 88 correspond to both the nines complement of the digit represented by the particular OR gate 88 and the nines complement of that digit plus ten. For example, in subtracting, OR gate 88–0 receives one input from gate 85–10:9, so that the digit zero output of gate 88–0 under these conditions represents the nines complement of the digit nine, and gate 88–0 receives another input from AND gate 85–0:19 so that the number 19 represents the nines complement plus ten of the digit zero from gate 88–0. In the method described above it is seen that the sum-difference signals are digitized on a decimal basis. Alternatively, the sum-difference signals could also be digitized on a bi-quinary basis by suitable modifications of the delay line 97 and the associated circuitry including blocking oscillators 90, 92 and AND gates 85.

In considering the general problem of carries and borrows, it will be apparent that carries and borrows will each be required under two conditions in a multi-order adding or subtracting operation. In adding, one of such conditions occurs when a sum is greater than 9 i.e., from 10 to 19. This, of course, requires a carry of one to the next higher order. The other condition in adding occurs when the sum in a given order is 9 and there is a carry from a prior order into the given order. This carry increases the 9 to a 10, thus producing a carry in the given order which must be passed on to the next higher order. In subtracting, one of such conditions occurs when a subtrahend digit is larger than the minuend digit. This requires a borrow of one from the next higher order. The other condition in subtracting occurs when the difference in a given order is zero and there is a borrow from a prior order into the given order. This borrow makes the subtahend larger than the minuend, thus producing a borrow in the given order which must be passed on to the next higher order.

To provide for carrier resulting from sums greater than 9 in the prior order and to provide for borrows occurring when the subtrahend digit exceeds the minuend digit, there is provided an OR gate 101*a* which receives five positive inputs and an OR gate 101*b* which receives five negative inputs. OR gates 101*a* and 101*b* each receive five inputs from the taps 102–10:19, 102–11:18, 102–12:17, 102–13:16 and 102–14:15 of a delay line 102. The input to delay line 102, represented by tap 102–10:19, is connected to conductor 93 through an additional section of delay line 102*a* and a negative blocking oscillator 103. Oscillator 103 is of the type which fires on a negative pulse but which produces a positive output pulse. Oscillator 103 thus fires at "9" time, after the positive pulse from clock 23 has traveled the length of delay line 21 and been inverted in polarity and reflected back along line 21 to tap 21–0:9 to which conductor 93 is connected. When oscillator 103 fires at "9" time, the positive output pulse therefrom travels through the delay section 102*a* and arrives at tap 102–10:19 at "10" time. This positive pulse then travels along delay 102 to the different taps thereof, so that positive pulses are supplied to the inputs of positive OR gate 101*a* at the times indicated by the designations of the delay line taps. The output from gate 101*a* is supplied to an OR gate 101*d*.

When the positive pulse from oscillator 103 reaches the end of line 102, it is inverted in polarity and reflected back along the line, arriving at tap 102–14:15 at "15" time, at tap 102–13:16 at "16" time, etc. Negative pulses from these taps are thus supplied to negative OR gate 101*b* at times corresponding to the numbers designating the different taps. The negative pulses from OR gate 101*b* are inverted in an inverter 101*c* and supplied to OR gate 101*d*. The output from OR gate 101*d* is supplied to a conductor 106 which can be considered the (10–19) conductor.

From the above description, it will be seen that conductor 106 will have pulses thereon at each of the times from "10" time through "19" time, so that these pulses may be utilized in determining when a sum in any order is between 10 and 19, thus necessitating a carry. Similarly, in the nines complement method of subtraction, when the sum of the subtrahend digit and the nines complement of the minuend digit is between 10 and 19, this indicates that the subtrahend digit exceeds the minuend digit, thus necessitating a borrow from the next higher order. To utilize the output of OR gate 101*d* in generating carries and borrows under the above described conditions, the output from device 101*d* is supplied through conductor 106 to the parallel inputs of a (10–19) AND gate for each of the orders. Such AND gates include a units order AND gate 110 (Fig. 3*b*), a tens order AND gate 120, and a hundreds order AND gate 130. The other inputs to AND gates 110, 120 and 130 are supplied from the associated sum and difference conductors 43, 63 and 83 for the respective orders. Thus, AND units 110, 120 and 130 will produce output pulses upon the simultaneous appearance of input pulses on the (10–19) conductor 106 and the associated sum and difference conductors for the respective AND units. As stated above the simultaneous appearance of these two input pulses for any of the different (10–19) AND gates 110, 120 and 130 in subtraction indicates that the subtrahend digit exceeds the minuend digit for that particular order, thus necessitating a borrow from the next higher order. Similarly, in addition, the simultaneous appearance of these two input pulses for any of the different (10–19) AND gates 110, 120 and 130 indicates a sum greater than nine in that particular order, thus necessitating a carry into the next higher order.

The output pulses produced by AND units 110, 120 and 130 are supplied as inputs to a plurality of carry-borrow (C–B) triggers 112, 122 and 132, respectively. Triggers 112, 122 and 132 are preferably of the bi-stable type which produce a continuous output signal on one or the other of their output conductors and which are operative to change the energized output conductor upon receipt of an input pulse. Triggers 112, 122 and 132 may be reset by means of a signal supplied from a common reset line 115.

Trigger 112 has two output lines, represented by conductors 118 and 119, which are connected to the respective inputs of AND gates 62*a* and 62*b*. Conductor 118 is energized when trigger 112 is in a reset state so that under these conditions AND gate 62*a* is open and a pulse from OR gate 57*d* passes through gate 62*a* and OR gate 62*c* conductor 63. When trigger 112 is switched by receipt of a pulse from device 110, conductor 118 is de-energized to close gate 62*a*, and conductor 119 is energized to supply an input to AND gate 62*b*. Thus, pulses from gate 57*d* pass through delay line 61 and AND gate 62*b* to OR gate 62*c* and conductor 63 when trigger 112 is switched. When reset conductor 115 is energized, trigger 112 de-energizes conductor 119 and again energizes conductor 118.

Next considering the problem of carries resulting from carries and borrows resulting from borrows, it will be remembered that carries resulting from carries may occur when a sum in a given order is nine, and borrows resulting from borrows may occur when the difference in a given order is zero. It will also be seen that the same tap on a delay line in the present invention represents both of the digits zero and nine. From a knowledge of the nines complement method of subtraction it will be appreciated that when the difference between the minuend digit and subtrahend digit is zero the sum of the subtrahend digit and the nines complement of the minuend digit will be nine. Thus, the pulse at "9" time on tap 21–0:9 of the delay line may be utilized in generating both carries resulting from carries and borrows resulting from borrows. To indicate when such carries or borrows may be required, there is provided an inverter 116 which receives an input from conductor 93. Since conductor 93 is connected to tap 21–0:9 of delay line 21, inverter 116 receives a negative pulse at "9" time and inverts this negative pulse to a positive pulse and supplies this positive pulse to a conductor 109.

To utilize the pulses on conductor 109 to provide for carries resulting from carries from the preceding order and to provide for borrows resulting from borrows from the preceding order, there is provided a second series of AND gates 123 and 133. AND gates 123 and 133 each receive one input from conductor 109. The other inputs to each of AND gatets 123 and 133 are supplied from the associated sum and difference conductors 63 and 83 for the tens and hundreds orders, respectively.

As stated above, whenever the subtrahend and minuend digits for a given order are equal, representing a difference of zero for that order, the sum of the subtrahend digit and the nines complement of the minuend digit will be nine, so that the difference pulse for that order will reach the difference conductor at the same time the master pulse in delay line 21 returns to tap 21–0:9 with a negative polarity. Similarly, in adding, when the sum of the augend and addend digits in a given order is nine, the sum pulse for that order will reach the sum conductor at the same time the negative pulse in master delay line 21 reaches tap 21–0:9. Thus, the simultaneous arrival of pulses on any of the sum or difference conductors 43, 63 or 83 and a negative pulse at tap 21–0:9 indicates a difference of zero in that particular order in the case of subtracting, or indicates a sum of nine in the case of addition. Accordingly, AND gate 123 or AND gate 133 will produce an output pulse when there is a difference of zero between the minuend and subtrahend digits for that particular order in subtracting, or when the sum of the augend and addend digits is nine in the case of addition.

The output pulse from AND gate 123 is supplied as the single input to a tens (0 and 9) trigger 124, and the output pulse from AND gate 133 is supplied as the single input to a hundreds (0 and 9) trigger 134. Triggers 124 and 134, when energized by an input pulse, produce a continuous output signal until reset, so that upon appearance of an output pulse from AND gates 123 or 133, the associated one of triggers 124 and 134 produces a continuous output signal. The output signal from trigger 124 is supplied as one input to a tens carry-borrow AND gate 125. The other input to AND gate 125 is supplied from the units-borrow trigger 112 by way of conductor 119, so that upon the simultaneous appearance of output signals from triggers 112 and 124, AND gate 125 is energized to produce an output signal which is supplied through a conductor 126 to the input of the tens carry-borrow trigger 122.

Trigger 122 has two output lines, represented by conductors 128 and 129, which are connected to the respective inputs of AND gates **82*a* and 82*b*. Conductor 128 is energized when trigger 122 is in a reset condition, so that under these conditions gate 82*a* is open and a pulse from OR gate 77*d* passes through tap 81–0 and gate 82*a* to OR gate 82*c* and conductor 83. When trigger 122 is switched by the simultaneous appearance of output signals from devices 120 and 125, conductor 128 is de-energized to close gate 82*a* and conductor 129 is energized to supply an input to AND gate 82*b*. Any pulses from OR gate 77*d* then pass through delay line 81 to tap 81–1, gate 82*b* and OR gate 82*c* to conductor 83**.

Similarly, hundreds order (0 and 9) trigger 134 supplies an output signal to one input of a hundreds carry-borrow AND network 135. The other input to AND network 135 is supplied through conductor 129 from the output of tens carry-borrow trigger 122, so that AND network 135 produces an output signal upon the simultaneous appearance of input signals from tens carry-borrow trigger 122 and hundreds (0 and 9) trigger 134. The output pulse from AND network 135 is supplied through a conductor 136 as one input to the hundreds carry-borrow trigger 132. Hundreds trigger 132 receives this input, together with an input from the hundreds (10–19) AND gate 130, and is operable to produce an output signal which is continuous until reset. The output from hundreds carry-borrow trigger 132 is supplied, in the case of additional orders being utilized, to the carry-borrow delay line control and the corresponding carry-borrow AND gate for the next highest order, i.e., the thousands order.

Figure 1:
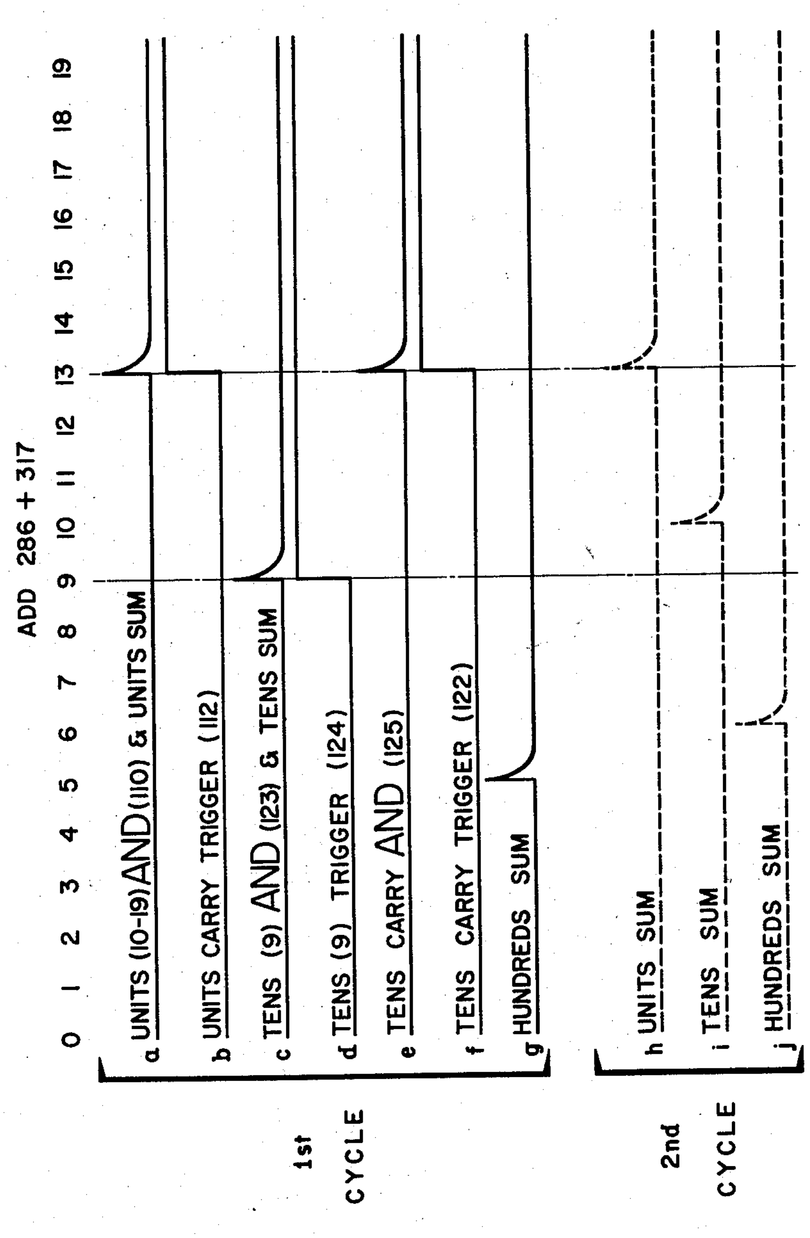
Fig. 1 is a series of timing diagrams illustrating the relationship among the pulses in the apparatus of the present invention in a representative adding operation.
Figure 2:
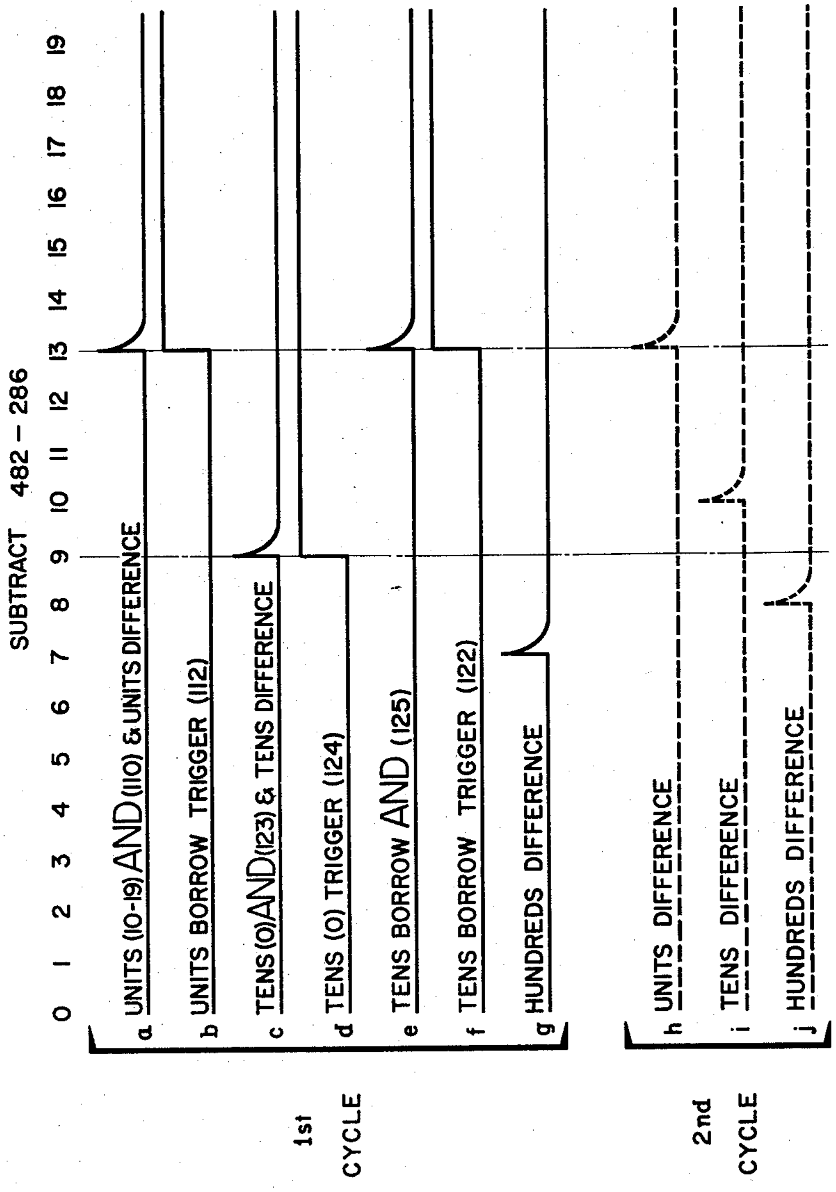
Fig. 2 is a series of timing diagrams representing the relationship among the pulses in the apparatus of the present invention when performing a representative subtraction operation.

The operation of the present invention can perhaps best be understood by reference to the timing diagrams of Figs. 1 and 2 which illustrate the relationships between the pulses and signals in the different circuits when performing representative adding and subtracting operations. In the adding timing diagram of Fig. 1, it is assumed that an addend of 317 is to be added to an augend of 286. To enter the augend of 286 in the apparatus, switch 65–2:7 of the hundreds augend selection switch bank, switch 45–1:8 of the tens augend selection switch bank, and switch 25–3:6 of the units augend selection switch bank are closed. Further, group selection switch 70 is actuated to close contact **70*c*, representing hundreds augend digits from 0 to 4; switch 50 is actuated to close contact 50*b*, representing tens augend digits from 5 to 9; and switch 30 is actuated to close contact 30*b*, representing units augend digitts from 5 to 9. To enter the addend of 317 into the apparatus, switch 69–3:6 of the hundreds addend selection switch bank, switch 49–1:8 of the tens addend selection switch bank, and switch 39–2:7 of the units addend selection switch bank are closed. Further, digit group selection switches 80 and 60 are actuated to close contacts 80*c* and 60*c*, representing hundreds and tens addend digits from 0 to 4, and switch 40 is actuated to close contact 40*b***, representing units addend digits from 5 to 9.

After the entering of the augend and addend digits, master add-subtract selection switch 32 may be actuated to the "add" position to connect conductor 35 to source 34 through contact **32*b* and arm 32*a*. This energizes coils 31*c*, 51*c*, and 71*c*** (Fig. 3*a*) and coil **91*c*** (Fig. 3*c*) of the different sections of the add-subtract switch to cause these switch sections to assume the "add" position shown in the drawings. After this entering of the augend and addend digits and the actuation of the other switches including the reset line, clock 23 may be started to deliver input pulses to the input of master delay line 21.

With respect to the hundreds section, the positive master clock pulse travels through delay line 21 to tap 21–2:7, then travels to the closed augend selection switch 65–2:7 in the hundreds section and then through conductor 66 to the parallel inputs of inverter **67*c* and AND gate 67*b*. At this time, arm 70*a* engages contact 70*c*, thus supplying one input from source 28 and conductor 29 to AND gate 67*b* through contact 71*e* and arm 71*b* of switch 71. AND gate 67*b* thus operates upon appearance of the positive pulse on conductor 66 to pass a positive pulse through OR gate 67*d* to conductor 72 and the input to hundreds addend delay line 68. The pulse then travels through delay line 68 to tap 68–3:6 thereof, then through the closed addend selection switch 69–3:6 to conductor 73. The pulse thus arrives at conductor 73, after undergoing a two unit delay in the hundreds augend section and a three unit delay in the hundreds addend section, for a total delay of five units. The pulse on conductor 73 is supplied to the parallel inputs of inverter 77*c* and And gate 77*b*. Since contact 80*c* is closed at this time, an input is supplied from source 28 through conductor 29, contact 80*c* and arm 80*a* to gate 77*b* so that this gate operates upon appearance of the positive pulse on conductor 73. Operation of gate 77*b*** thus passes a pulse through OR gate 77*d* at "5" time in the first cycle. At "5" time in the first cycle, gate 82*a* is open so that the pulse from gate 77*d* passes through gates 82*a* and 82*c* to sum conductor 83 without undergoing any delay in the hundreds carry delay line 81. The pulse is thus supplied from conductor 83 to one input of each of AND gates 130 and 133 at "5" time.

Next considering the tens order augend and addend sections, the positive master pulse traveling through master delay line 21 will branch off at tap 21–1:8 of this delay line and flow through the closed tens order augend selection switch 45–1:8 to conductor 44. From conductor 44 the pulse is supplied in parallel to the inputs of inverter 47*c* and AND gate 47*b*. Since switch 51 is in the "add" position shown and since contact 50*b* is closed, representing tens order augend digits from 5 to 9, gate 47*b* does not receive an input from source 28 and conductor 29 and consequently this gate does not operate when this positive pulse appears on conductor 44. Similarly, although AND gate 47*a* does receive an input from source 28 through conductor 29, contact 50*b*, arm 50*a*, contact 51*d* and arm 51*a*, inverter 47*c* inverts the polarity of the positive pulse on conductor 44 so that gate 47*a* does not receive the second positive pulse required to operate this gate. Thus, during the time the positive pulse travels down line 21, neither of gates 47*a* and 47*b* operate.

The positive pulse in delay line 21 continues on down the line until it reaches the shorted end thereof where it is inverted in polarity and reflected back down the line. When this negative pulse reaches tap 21–1:8, a portion of it flows through closed switch 46–1:8 to conductor 44 and the inputs to inverter 47*c* and AND gate 47*b*. The negative pulse is inverted in polarity in device 47*c* and supplied as a positive input pulse to AND gate 47*a*. Since gate 47*a* is receiving one input from source 28 through the above described circuit, the receipt of the positive pulse from inverter 47*c* causes this gate to operate at this time to pass a positive pulse through OR gate 47*d* to conductor 46 and the input to the tens addend delay line 48. The pulse then travels through one section of addend delay line 48 to tap 48–1:8 and then through the closed addend selection switch 49–1:8 to conductor 52.

From conductor 52 the positive pulse is supplied in paralllel to the inputs of inverter 57*c* and AND gate 57*b*. Contact 60*c* of switch 60 is closed so that a signal is supplied from source 28 through conductor 29, arm 60*a* and contact 60*c* to gate 57*b* to cause this gate to operate upon appearance of the positive pulse on conductor 52. This pulse from gate 57*b* is supplied through OR gate 57*d*. At this time, gate 62*a* is open and gate 62*b* is closed, so that the pulse from gate 57*d* travels directly through conductor 64*a* and gate 62*a* to OR gate 62*c* and conductor 63, thus by-passing the single section of the tens-carry delay line 61. The pulse arriving on conductor 63 thus has been delayed by eight units in the augend section and one unit in the addend section for a total delay of nine units.

This pulse on conductor 63 arrives at the input to the tens (0 and 9) AND network 123 at "9" time, simultaneously with the arrival at this AND network of a pulse on the (0 and 9) conductor 109 from the tap 21–0:9 of master delay line 21 and inverter 116, as shown by the timing diagram of Fig. 1*c*. The simultaneous appearance of two input signals on AND network 123 causes this network to supply an output pulse to operate the tens (0 and 9) trigger 124, which at this time produces a continuous output signal, as shown in Fig. 1*d* of the timing diagram. The output from tens (0 and 9) trigger 124 is supplied as one input to the tens carry-borrow AND network 125. In this connection it will be noted that at the time of generation of the output signal from trigger 124, i.e., "9" time, the units carry-borrow trigger 112 has not yet been operated, so that at "9" time there is only one input to AND network 125 and hence network 125 does not produce an output signal at this time.

The pulse on conductor 63, which has been delayed a total of nine units, is also supplied as one input to the tens (10–19) AND gate 120. The other input to this AND network 120 is supplied by way of the (10–19) conductor 106 from the output of OR gate 101*d*. However, since the pulse from conductor 63 arrives at gate 120 at "9" time, whereas no pulses arrive at the other input to gate 120 from conductor 106 before "10" time, there is no coincidence of input pulses on gate 120, and this gate is not operated.

With respect to the units order, the pulse from clock 23 travels through delay line 21 until it reaches tap 21–3:6, at which time a portion of the pulse leaves the delay line and travels through closed augend selection switch 25–3:6 to conductor 26 and the parallel inputs of inverter 27*c* and AND gate 27*b*. Since contact 30*c* of switch 30 is open, gate 27*b* does not receive an input from source 28 and consequently this gate does not operate at this time. Similarly, the positive pulse on conductor 26 is inverted by inverter 27*c* so that it does not supply a positive input to gate 27*a*, even though gate 27*a* does receive one positive input from source 28 through conductor 29, arm 30*a*, contact 30*b*, contact 31*d* and arm 31*a*. Thus, neither of gates 27*a*, 27*b* operate at this time.

The positive pulse continues down line 21 to the end thereof where it is inverted in polarity and reflected back down the line. The reflected negative pulse reaches tap 21–3:6 at "6" time, at which time a portion of it flows through closed switch 25–3:6 to conductor 26 and the inputs to devices 27*b* and 27*c*. Inverter 27*c* inverts the negative pulse and supplies it as a positive input pulse to gate 27*a*. Since gate 27*a* is also receiving a positive input from source 28 through the above described circuit, gate 27*a* operates at this time to pass a positive pulse through OR gate 27*d* to conductor 36 and the input to units addend delay line 38. The positive pulse then travels through delay line 38 until it reaches tap 38–2:7 and closed switch 39–2:7. A portion of the pulse flows through this closed switch to conductor 41 and the parallel inputs to inverter 37*c* and AND gate 37*b*. Since contact 40*c* is open, gate 37*b* does not receive an input from source 28 so this gate does not operate at this time. Similarly, inverter 37*c* inverts the positive input pulse from conductor 41 so that gate 37*a* does not operate at this time.

The positive pulse in delay line 38 continues on down the line until it reaches the end thereof where it is inverted in polarity and reflected back down the line. This reflected negative pulse thus reaches tap 38–2:7 and closed switch 39–2:7 after seven units of delay in line 38. A portion of this negative pulse flows through closed switch 39–2:7 and conductor 41 to inverter 37*c* where it is inverted in polarity and supplied as a positive input to gate 37*a* to cause this gate to operate at this time. This passes a positive pulse through OR gate 37*d* to conductor 43 at this time. At this time the units sum pulse has been delayed by six units in the augend selection portion of delay line 21 and an additional seven units in addend delay line 38, for a total delay of thirteen units. This is shown in the timing diagram of Fig. 1*a*, illustrating the arrival of this sum pulse on conductor 43, representing the units sum during the first cycle and also representing the input to the units (10–19) AND gate 110, since conductor 43 is connected as one input to AND gate 110.

It will be recalled that devices 101*a*, 101*b*, 101*c*, 101*d*, 103 and delay line 102 (Fig. 3*b*) are provided to produce a series of output pulses on conductor 106 at each of the times from "10" time through "19" time. Thus, at "13" time, the "13" time pulse on conductor 106 coincides in time with the arrival of the units sum pulse on conductor 43. Since both conductors 106 and 43 are connected to the inputs to the units (10–19) AND gate 110, this gate operates at "13" time to produce an output pulse to the units carry trigger 112. Thus, as shown by the timing diagram of Fig. 1*b*, trigger 112 is operated at "13" time to supply a continuous output signal until it is reset. This continuous output signal from the units-carry trigger 112 is supplied as one input to the tens-carry AND network 125.

Summarizing the operation of the tens and units sections at this time, the tens (0 and 9) trigger 124 is operated at "9" time and the output thereof supplied as one input to the tens-carry AND network 125, thus preparing network 125 for the generation of a carry resulting from a carry if there is a carry produced in the prior order, i.e., the units order. Since this carry from the prior order is produced at "13" time by the units-carry trigger 112, the tens-carry AND network 125 is energized by the simultaneous appearance of two input signals thereon at "13" time to produce an output pulse which is supplied through conductor 126 to the input of the tens-carry trigger 122. Trigger 122 thus operates at "13" time, as shown by the timing diagram of Fig. 1*f*, to de-energize conductor 128 and energize conductor 129.

This action of trigger 122 closes gate **82*a* and opens gate 82*b* to thereafter introduce the delay of delay line 81 in any pulse traveling between gate 77*d* and conductor 83. However, it will be noted that since the first cycle pulse through gate 77*d* of the hundreds order section passed therethrough at "5" time, while gate 82*a* was open, the generation of the carry from the tens order at "13" time is ineffective to enter this carry into the hundreds sum pulse on conductor 83** during the first cycle of the apparatus and such entering must await the second cycle.

Thus, at the end of the first cycle of the apparatus of the present invention the sums have been generated in the three orders shown and the carries have been generated. In this particular example, owing to the relative times of generation of the carries, the carries have not been entered in the sums on the first cycle since these sums occurred prior to generation of the carries. That is, at the end of the first cycle the units order sum is indicated as 13, which is the correct sum since there is no carry from a preceding order for the units order. For the tens order, on the first cycle the sum is indicated as 9, which is the correct sum of the augend and addend digits of the tens order but does not take into account the carry from the "13" sum in the units order. Similarly, in the hundreds order at the end of the first cycle the indicated sum is 5, which is the correct sum for the augend and addend digits of the hundreds order but does not take into account the carry from the tens order resulting, in turn, from the carry from the units order. The first cycle sums on conductors 43, 63 and 83 could be supplied to coincidence circuits 85 to produce outputs indicating the values of these sums without carries, but these output indications do not represent the true sums on the first cycle and hence they are not utilized.

The apparatus of the present invention will produce the correct sum on the second and all subsequent cycles, taking into account the effects of carries generated during the first cycle. The second cycle is preferably initiated automatically at the end of the first cycle, since clock 23 may be designed to produce repetitive output pulses having a predetermined frequency. The first cycle should have a duration of at least 19 units of time in order to permit the measurement of the pulse timing from 0 through 19 in the different coincidence circuits. Thus, as the output pulse from clock 23 for the second cycle travels through delay line 21, it again undergoes 13 units of delay in the units section and the sum is indicated as 13 on the second cycle, as shown in Fig. 1*h*. The output sum will, of course, appear as the digit three from OR gate 88–3, where the sum is to be produced on a digitized basis, as in the illustrated embodiment.

For the tens order, the pulse undergoes a delay of 8 units in the addend delay section and 1 unit in the augend delay section as in the first cycle. However, since AND gate **62*a* closed and AND gate 62*b* opened at "13" time in the first cycle, the pulse from OR gate 57*d* at "9" time in the second cycle travels through the single section of delay line 61 to AND gate 62*b* and OR gate 62*c* to conductor 63. Thus, this additional one unit of delay in the tens order carry delay line 61 causes the tens sum pulse to reach conductor 63 at "10" time, which is the correct sum in the particular operation considering the effect of the carry from the units order. This sum pulse on conductor 63 at "10" time is supplied through switch 87 and conductor 86 to coincidence circuits 85, where it coincides in time with the pulse from tap 97–10:9 of delay line 97 to produce coincidence in device 85–10:9**, as shown in Fig. 1*i*. This device produces an output to the digitizing OR gate 88–0, representing the proper digit for the sum of the tens order.

In the hundreds order section, the second cycle pulse again undergoes a delay of two units in the augend delay section and a delay of three units in the addend delay section for a total delay of five units, as in the first cycle. However, since AND gate **82*a* was closed and AND gate 82*b* opened at "13" time in the first cycle, the pulse from OR gate 77*d* at "5" time in the second cycle must travel through delay line 81 to gate 82*b*. This hundreds sum pulse from gate 77*d* thus undergoes an additional one unit of delay in the hunderds carry delay line 81, so that it arrives on the hundreds sum conductor 83 at "6" time, thus representing the correct sum for the hundreds digits, taking into account the carry from the tens order. This pulse or sum conductor 83 is supplied to coincidence circuits 85 and its arrival at these circuits coincides in time with the arrival at gate 85–6:13 of the pulse from tap 97–6:13 of delay line 97 so that gate 85–6:13 produces an output pulse which is supplied to digitizing OR gate 88–6**.

It will thus be seen that the apparatus of the present invention operates to produce a true sum in only two cycles, regardless of the number of carries involved. On the second and all subsequent cycles, therefore, the apparatus will supply signals through OR gates 88 representing the digits of the sum of the augend and addend, and the apparatus will continue to supply these output signals repetitively until it is reset or until a new set of numbers is entered on the augend and addend switches.

The operation of the apparatus of the present invention in performing a representative subtracting operation is illustrated in the timing diagrams of Fig. 2. In the diagrams of Fig. 2, it is assumed that a subtrahend of 286 is to be subtracted from a minuend of 482. To enter the minuend of 482 in the apparatus, switch 65–4:5 of the hundreds minuend selection switch bank, switch 45–1:8 of the tens minuend selection switch bank, and switch 25–2:7 of the units minuend selection switch bank are closed. Further, the hundreds minuend digit group selection switch 70 is actuated to close contact **70*c*, representing digits from 0 to 4; tens minuend digit group switch 50 is actuated to close contact 50*b*, representing digits from 5 to 9; and units minuend digit group switch 30 is actuated to close contact 30*c*, representing digits from 0 to 4. The master add-subtract selection switch 32 is moved to the "subtract" position to disconnect conductor 35 from source 34, thus de-energizing coils 31*c*, 51*c*, 71*c* and 91*c*** and causing the switches associated with these coils to assume the "subtract" position opposite to that illustrated in the drawings.

From a knowledge of the nines complement method of subtraction, the effect of the action of switches 31, 51, 71 and 91 will be apparent. In nines complement subtraction the nines complement of the minuend digit is added to the subtrahend digit and the sum of these quantities represents the difference between the minuend and subtrahend digits in terms of either its nines complement or its nines complement plus ten. It will be recalled that each tap of the different delay lines represents two digits, one of the digits being the nines complement of the other digit. When performing addition, each augend and addend digit was represented by a number of units of delay equal to the particular digit. However, in subtracting, switches 31, 51 and 71 effectively select the nines complement of the selected minuend digits in each order by reversing the connections to AND gates 27*a*, 27*b*, 47*a*, 47*b*, 67*a* and 67*b*, so that pulses in the minuend sections undergo delays equal to the nines complements of the actual minuend digits selected by minuend selection switches 25, 45 and 65.

For example, in the representative subtracting operation being described, switch 25–2:7, together with contact 30*c*, is closed to represent the units minuend digit of 2. However, since switch 31 in the "subtract" position connects source 28 to the input of AND gate 27*a* through arm 30*a*, contact 30*c*, contact 31*f* and arm 31*a*, gate 27*a* operates on the negative pulse in delay line 21 at "7" time, this negative pulse being inverted by inverter 27*c* and supplied as a positive input to gate 27*a*. It will be noted that gate 27*b* does not operate on the positive pulse in line 21 at "2" time, since this gate receives no input from source 28 when contact 30*b* is open and switch 31 is in the "subtract" position. Thus, the pulse in the units minuend section undergoes a delay of seven units, representing the nines complement of the selected minuend digit of 2. This action applies equally to the other units minuend digits and to the tens and hundreds minuend digits as well.

To enter the subtrahend of 286, hundreds subtrahend switch 69–2:7 and digit group selection contact 80*c* are closed, tens subtrahend switch 49–1:8 and digit group selection contact 60*b* are closed, and units subtrahend switch 39–3:6 and digit group selection contact 40*b* are closed. It will be noted that in the different subtrahend sections the pulses will undergo a number of units of delay equal to the different subtrahend digits. After this entering of the minuend and subtrahend numbers, clock 23 may be started to deliver input pulses to the input of master delay line 21.

With respect to the hundreds section, the positive pulse from clock 23 travels through delay line 21 to tap 21–4:5, then travels through the closed minuend selection switch 65–4:5 in the hundreds section to conductor 66 and the parallel inputs of devices 67*b* and 67*c*. Since contact 70*b* is open, gate 67*b* receives no input from source 28 and does not operate at this time. Gate 67*a* does not operate at this time either, even though it receives one input from source 28 through arm 70*a*, contact 70*c*, contact 70*f* and arm 71*a* since inverter 67*c* inverts the posiive pulse on conductor 66. The positive pulse thus continues down line 21 until it reaches the end and is reflected back with a negative polarity. When the negative reflected pulse on line 21 reaches tap 21–4:5 at "5" time, it flows through closed switch 65–4:5 and conductor 66 to inverter 67*c* where it is inverted and supplied as a positive input to AND gate 67*a*. Gate 67*a* operates at this time to supply a pulse through OR gate 67*d* to conductor 72 and the input to the subtrahend delay line 68. It will be seen that the pulse on conductor 72 has been delayed by five units, corresponding to the nines complement of the hundreds minuend digit.

The pulse then travels through delay line 68 to tap 68–2:7 thereof, then through the closed subtrahend selection switch 69–2:7 to conductor 73 and the inputs to inverter 77*c* and gate 77*b*. Since contact 80*c* of switch 80 is closed, gate 77*b* receives an input from source 28 so that this gate operates upon appearance of the positive pulse on conductor 73 to produce an output pulse through OR gate 77*d*. The pulse has undergone five units of delay in the hundreds minuend section and an additional two units of delay in the hundreds subtrahend section, for a total of seven units of delay. This pulse thus leaves gate 77*d* at "7" time. At "7" time in the first cycle, gate 82*a* is open so that the pulse from gate 77*d* passes through gates 82*a* and 82*c* to conductor 83 without undergoing any delay in the hundreds borrow delay line 81. The pulse is thus supplied from conductor 83 to one input of each of AND gates 130 and 133 at "7" time, as shown by the timing diagram of Fig. 2*g*.

Next, considering the tens order minuend and subtrahend sections, the positive pulse from clock 23 traveling through master delay line 21 will branch off at tap 21–1:8 of this delay line and flow through the closed tens order minuend selection switch 45–1:8 to conductor 44 and the parallel inputs of inverter 47*c* and AND gate 47*b*. Since contact 50*b* is closed, gate 47*b* receives an input from source 28 through conductor 29, arm 50*a*, contact 50*b*, contact 51*g* and arm 51*b*, so that gate 47*b* operates upon appearance of the positive pulse on conductor 44. It will be noted that at this time the pulse has undergone one unit of delay, corresponding to the nines complement of the tens minuend digit of eight.

The positive pulse then passes through OR gate 47*d* to conductor 46 and the input to tens subtrahend delay line 48. A portion of this pulse flows through tap 48–1:8 to closed switch 49–1:8 and conductor 52 to the input to inverter 57*c* and AND gate 57*b*. However, neither of gates 57*a*, 57*b* operates at this time, since gate 57*b* does not receive an input from source 28, and inverter 57*c* inverts the positive pulse on conductor 44 to prevent gate 57*a* from operating. The positive pulse continues on down line 48 until it is reflected and inverted in polarity at the end of the line and returns to tap 48–1:8 as a negative pulse after eight units of delay in line 48. A portion of this negative pulse flows through closed switch 49–1:8 and conductor 44 to inverter 47*c* where it is inverted in polarity and supplied as the second positive input to gate 47*a*. Gate 47*a* operates at this time to produce a positive output pulse through OR gate 47*d*. At this time, gate 62*a* is open and gate 62*b* is closed, so that the pulse travels directly through conductor 64*a* and gate 62*a* to OR gate 62*c* and conductor 63, thus by-passing the single section of the tens-borrow delay line 61. The pulse arriving on conductor 63 thus has been delayed by one unit in the minuend section, corresponding to the nines complement of the tens minuend digit, and has been delayed an additional eight units in the subtrahend section for a total delay of nine units. This pulse thus arrives on conductor 63 at "9" time.

This pulse at "9" time arrives at the input to the tens (0 and 9) AND network 123 simultaneously with the arrival at this AND network of a pulse on the (0 and 9) conductor 109 from the tap 21–0:9 of master delay line 21 through inverter 116, as shown by the timing diagram of Fig. 2*c*. The simultaneously appearance of two input signal on AND network 123 indicates the possibility of a borrow from a borrow and causes this network to supply an output to operate the tens (0 and 9) trigger 124, which at this time produces a continuous output signal, as shown in Fig. 2*d* of the timing diagram. The output from tens (0 and 9) trigger 124 is supplied as one input to the tens-borrow AND network 125. In this connection, it will be noted that at the time of generation of the output signal from trigger 124 in the first cycle, i.e., at "9" time, the units-borrow trigger 112 has not yet been operated, so that there is only one input to AND network 125 and hence network 125 does not produce an output pulse at this time.

The pulse on conductor 63, which has been delayed a total of nine units, is also supplied as one input to the tens (10–19) AND gate 120. The other input to this AND network 120 is supplied by way of conductor 106 from the output of OR gate 101*d*. However, since the pulse from conductor 63 arrives at gate 120 at "9" time, whereas no pulses arrive at the other input to gate 120 from conductor 106 before "10" time, there is no coincidence of input pulses on gate 120 and this gate is not operated.

With respect to the units order, the positive pulse from clock 23 travels through delay line 21 until it reaches tap 21–2:7, at which time a portion of the pulse leaves the delay line and travels through closed minuend selection switch 25–2:7 to conductor 26 and the inputs of inverter 27*c* and AND gate 27*b*. However, neither of AND gates 27*a* and 27*b* operates at this time since gate 27*b* does not receive a signal from source 28, and inverter 27*c* inverts the positive pulse to prevent gate 27*a* from operating at this time. The positive pulse thus continues to the end of line 21 and returns to tap 21–2:7 as a negative pulse after seven units of delay. A portion of the negative pulse flows through closed switch 25–2:7 to conductor 26 and the input to inverter 27*c* where it is inverted and supplied as a positive input to AND gate 27*a*. Gate 27*a* thus operates at this time to produce an output pulse which is supplied through OR gate 27*d* to conductor 36 and the input to subtrahend delay line 38.

In delay line 38 a portion of the positive pulse flows through closed switch 39–3:6 to conductor 41 and the inputs to inverter 37*c* and AND gate 37*b*, but neither of gates 37*a* and 37*b* operates at this time since gate 37*b* receives no input from source 28 and inverter 37*c* prevents gate 37*a* from operating. The positive pulse thus continues down line 38 and returns to tap 38–3:6 as a negative pulse after six units of delay since entering line 38. A portion of this negative pulse flows through closed switch 39–3:6 to conductor 41 and the inputs to devices 37*c* and 37*b*. The negative pulse is inverted by device 37*c* and supplied to gate 37*a* to cause this gate to operate at this time. It will be seen that gate 37*a* receives an input from source 28 through conductor 29, arm 40*a* and contact 40*b*.

The positive pulse from gate 37*a* is passed through OR gate 37*d* to conductor 43. At this time, the pulse has been delayed by seven units in the minuend portion of delay line 21, representing the nines complement of the units minuend digit, and an additional six units in subtrahend delay line 38, for a total delay of thirteen units. This is shown in the timing diagram of Fig. 2*a*, illustrating the arrival of this pulse on conductor 43 at "13" time. This pulse is also supplied as one input to the units (10–19) AND gate 110, since conductor 43 is connected as one input to AND gate 110.

It will be recalled that devices 101*a*, 101*b*, 101*c* and 101*d*, in association with delay line 102 and blocking oscillator 103, produce on conductor 106 a series of pulses for each of the times from "10" time through "19" time. Thus, the pulse on conductor 106 corresponding to "13" time occurs simultaneously with the arrival on conductor 43 of the units difference pulse delayed by thirteen units of time in the units section. This pulse on conductor 106 is supplied as the other input to the units (10–19) AND gate 110. AND gate 110 thus has two inputs thereon at "13" time, so that it produces an output pulse to the units-borrow trigger 112 at this time. Thus, as shown by the timing diagram of Fig. 2*b*, trigger 112 is rendered conductive at "13" time to supply a continuous output signal until it is reset. This continuous output signal from the units-borrow trigger 112 is supplied as one input to the tens-borrow AND network 125.

Summarizing the operation of the tens and units sections at this time, the tens (0 and 9) trigger 124 is operated at "9" time and the output thereof supplied as one input to the tens-borrow AND network 125, thus preparing network 125 for the generation of a borrow resulting from a borrow if there is a borrow produced in the prior order, i.e., the units order. Since this borrow is produced by the prior order at "13" time by the units-borrow trigger 112, the tens-borrow AND network 125 is energized by the simultaneous appearance of two input signals thereon at "13" time to produce an output pulse which is supplied through conductor 126 to the input of the tens-borrow trigger 122. Trigger 122 thus operates at "13" time, as shown by the timing diagram of Fig. 2*f*, to de-energize conductor 128 and energize conductor 129.

This action of trigger 122 closes gate 82*a* and opens gate 82*b* to thereafter introduce the delay of line 81 in any pulse traveling between gate 77*d* and conductor 83. However, it will be noted that since the first cycle pulse on conductor 83 of the hundreds order section passed therethrough at "7" time, while gate 82*a* was open, the generation of the borrow from the tens order at "13" time is ineffective to enter this borrow into the hundreds difference pulse on conductor 83 during the first cycle of the apparatus and such entering must await the second cycle.

Thus, at the end of the first cycle of the apparatus of the present invention, the differences have been generated in the three orders shown and the borrows have been generated. In this particular example, owing to the relative times of generation of the borrows and the differences, the borrows have not been entered in the differences on the first cycle, since these differences occurred prior to the generation of the borrows. The first cycle differences could be supplied to coincidence circuit which together with OR gates could produce outputs indicating the values of these differences without borrows, but these output indications do not represent the true differences on the first cycle and hence they are not utilized.

The apparatus of the present invention will produce the correct difference on the second and all subsequent cycles, taking into account the effects of borrows generated during the first cycle. The second cycle is preferably initiated automatically at the end of the first cycle, since clock 23 may be designed to repetitively produce output pulses having a predetermined frequency. As in the case of addition, the first cycle has a duration of at least nineteen units of time to permit generation of pulses representing the times from "0" time through "19" time. Thus, as the output pulse from clock 23 for the second cycle travels through delay line 21, it again undergoes 13 units of delay in the units delay section and is supplied to conductor 43. From a study of the connections of AND gates 85 and OR gates 88, it will be seen how the pulses on the difference conductors 43, 63 and 83, representing the sums of the subtrahend digits and either the nines complements of the minuend digits or the nines complements of the minuend digits plus ten for the different orders, are connected to indications of digits representing the differences between the minuend and subtrahend digits. For example, the units difference pulse arrives on conductor 43 at "13" time, representing the sum of the units subtrahend digit six and the nines complement of the units minuend digit two. This difference pulse at "13" time is supplied through switch 87 and conductor 86 to the inputs to AND gate 85 where its arrival coincides in time with the arrival of the positive pulse from delay line tap 97–6:13 to AND gate 85–6:13. Gate 85–6:13 thus operates at this time to supply a positive pulse to operate OR gate 88–6. OR gate 88–6 thus produces an output pulse indicating the digit six, which is the correct digit representing the difference between the units minuend and subtrahend digits.

For the tens order, the second cycle pulse in delay line 21 undergoes a delay of 1 unit in the minuend delay section and 8 units in the subtrahend delay section, as in the first cyle. However, since AND gate 62*a* closed and AND gate 62*b* opened at "13" time in the first cycle, the second cycle pulse from OR gate 57*d* travels through the single section of delay line 61 to AND gate 62*b* and OR gate 62*c* to conductor 63. Thus, this additional one unit of delay in the tens order borrow delay line 61 causes the tens difference pulse to reach conductor 63 at "10" time. This difference pulse on conductor 43 at "10" time is supplied through switch 87 and conductor 86 to coincidence circuits 85, where it coincides in time with the pulse from tap 97–9:10 of delay line 97 to produce coincidence in device 85–9:10, as shown in Fig. 2*i*. Gate 85–9:10 produces an output to the digitizing OR gate 88–9, which produces an output representing the digit nine, which is the proper digit for the difference in the tens order.

In the hundreds order section, the second cycle pulse again undergoes a delay of 5 units in the minuend delay section and a delay of 2 units in the subtrahend delay section, for a total delay of 7 units, as in the first cycle. However, since AND gate 82*a* was closed and AND gate 82*b* opened at "13" time in the first cycle, the second cycle pulse from OR gate 77*d* must travel through delay line 81 to gate 82*b*. This hundreds difference pulse from gate 77*d* thus undergoes an additional one unit of delay in the hundreds borrow delay line 81, so that it arrives on the hundreds difference conductor 83 at "8" time. This difference pulse is supplied through switch 87 and conductor 86 to the inputs of AND gates 85 where its arrival coincides in time with the arrival at gate 85–11:8 of a positive pulse from tap 97–11:8 of delay line 97. Gate 85–11:8 thus operates at this time to produce an output pulse to operate OR gate 88–1. Gate 88–1 produces an output indicating the digit one, which is the correct difference for the hundreds digits, taking into account the borrow from the tens order.

It will thus be seen that the apparatus of the present invention operates to produce a true difference in only two cycles, regardless of the number of borrows involved. On the second and all subsequent cycles, therefore, the apparatus will supply signals through OR gates 88 representing the digits of the difference between minuend and subtrahend, and the apparatus will continue to supply these output signals repetitively until it is reset or until a new set of numbers is entered on the minuend and subtrahend switches.

In the above described embodiment the three orders shown were labeled units, tens, and hundreds, respectively, in order to illustrate clearly the operation of the apparatus in performing representative arithmetic operations. However, it will be understood that the invention is operative to perform addition or subtraction utilizing any number of orders desired, and that regardless of the number of such orders utilized in the operation, the apparatus of the present invention will produce an indication of the sum or difference between these numbers in two cycles, taking into account the effects of carries or borrows from preceding orders and entering these carries or borrows on the second and all subsequent cycles. Further, although the illustrated embodiment utilized a serial read-out of the sums or differences by order, it will be apparent to those skilled in the art that by suitable modification of the apparatus the sums or differences from all orders can be read out simultaneously if desired. Similarly, although the invention has been illustrated in connection with a system employing a radix of ten, it will be apparent that the invention may be utilized in a system which is based on some other radix.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for performing arithmetic operations comprising an electrical delay element having a plurality of units of delay therein, means for short-circuiting one end of said delay element, means for supplying an input pulse of one polarity to the other end of said delay element, whereby said pulse traverses said delay element with said one polarity and is inverted in polarity at said short-circuited end and reflected back along said delay element, and means connected to spaced points along said delay element for detecting the arrival times of said pulse at said points.

2. Apparatus for performing arithmetic operations comprising an electrical delay element having a plurality of units of delay therein, means for short-circuiting one end of said delay element, means for supplying an input pulse of one polarity to the other end of said delay element, whereby said pulse traverses said delay element with said one polarity and is inverted in polarity at said short-circuited end and reflected back along said delay element, and means connected to spaced points along said delay element for detecting the polarity and the arrival times of said pulse at said points.

3. Apparatus for performing arithmetic operations comprising an electrical delay element having a plurality of units of delay therein, means for short-circuiting one end of said delay element, means for supplying an input pulse of one polarity to the other end of said delay element, whereby said pulse traverses said delay element with said one polarity and is inverted in polarity at said short-circuited end and reflected back along said delay element, switch means connected to spaced points along said delay element for representing different digits in said arithmetic operations by different numbers of said units of delay, and means connected to said switch means for detecting the arrival times of said pulse at said points.

4. Apparatus for performing arithmetic operations comprising an electrical delay element having a plurality of units of delay therein, means for short-circuiting one end of said delay element, means for supplying an input pulse of one polarity to the other end of said delay element, whereby said pulse traverses said delay element with said one polarity and is inverted in polarity at said short-circuited end and reflected back along said delay element, switch means connected to spaced points along said delay element for representing different digits in said arithmetic operations by different numbers of said units of delay, and means connected to said switch means for detecting the polarity and the arrival times of said pulse at said points.

5. Apparatus for performing arithmetic operations comprising an electrical delay element having a plurality of units of delay therein, means for short-circuiting one end of said delay element, means for supplying an input pulse of one polarity to the other end of said delay element, whereby said pulse traverses said delay element with said one polarity and is inverted in polarity at said short-circuited end and reflected back along said delay element, switch means connected to spaced points along said delay element for representing any of a first group of digits in said arithmetic operations by a number of units of delay of said pulse of said one polarity and for representing any of a second group of digits by a number of units of delay of said pulse of said inverted polarity, and detecting means connected to said switch means for detecting the polarity and the arrival times of said pulse at said points 6. Apparatus for performing arithmetic operations comprising an electrical delay element having a plurality of units of delay therein, means for short-circuiting one end of said delay element, means for supplying an input pulse of one polarity to the other end of said delay element, whereby said pulse traverses said delay element with said one polarity and is inverted in polarity at said short-circuited end and reflected back along said delay element, switch means connected to spaced points along said delay element for representing any of a first group of digits in said arithmetic operations by a corresponding number of units of delay of said pulse of said one polarity and for representing any of a second group of digits by a corresponding number of units of delay of said pulse of said inverted polarity, and detecting means connected to said switch means for detecting the polarity and the arrival times of said pulse at said points.

7. Apparatus for performing arithmetic operations comprising an electrical delay element having a plurality of units of delay therein, means for short-circuiting one end of said delay element, means for supplying an input pulse of one polarity to the other end of said delay element, whereby said pulse traverses said delay element with said one polarity and is inverted in polarity at said short-circuited end and reflected back along said delay element, switch means connected to spaced points along said delay element for representing any of the digits from 0 through 4 by a number of units of delay of said pulse of said one polarity and for representing any of the digits from 5 through 9 by a number of units of delay of said pulse of said inverted polarity, and detecting means connected to said switch means for detecting the polarity and the arrival times of said pulse at said points.

8. Apparatus for performing arithmetic operations comprising a plurality of groups of electrical delay elements having a plurality of units of delay therein, each of said groups representing a different numerical order in said arithmetic operations, each of said delay elements being short-circuited at one end thereof, means for supplying electrical pulses of one polarity to each of said groups of delay elements at the ends thereof opposite to said short-circuited ends, whereby said pulses traverse each of said delay elements with said one polarity and are inverted in polarity at said short-circuited ends and reflected back along said delay elements, means for delaying said pulses in said delay elements by amounts proportional to the numbers involved in said arithmetic operations, and means for determining the total delay undergone by said pulses in each of said groups of delay elements for determining the outcome of said arithmetic operations.

9. Apparatus for performing arithmetic operations comprising a plurality of groups of electrical delay elements having a plurality of units of delay therein, each of said groups representing a different numerical order in said arithmetic operations, each of said delay elements being short-circuited at one end thereof, means for supplying electrical pulses of one polarity to each of said groups of delay elements at the ends thereof opposite to said short-circuited ends, whereby said pulses traverse each of said delay elements with said one polarity and are inverted in polarity at said short-circuited ends and reflected back along said delay elements, switch means connected to spaced points along said delay elements for representing any of a first group of digits in said arithmetic operations by a number of units of delay of said pulse of said one polarity and for representing any of a second group of digits by a number of units of delay of said pulse of inverted polarity, and means for determining the total delay undergone by said pulses in each of said groups of delay elements for determining the outcome of said arithmetic operations.

10. Apparatus for performing arithmetic operations comprising a plurality of groups of electrical delay elements having a plurality of units of delay therein, each of said groups representing a different numerical order in said arithmetic operations, each of said delay elements being short-circuited at one end thereof, means for supplying electrical pulses of one polarity to each of said groups of delay elements at the ends thereof opposite to said short-circuited ends, whereby said pulses traverse each of said delay elements with said one polarity and are inverted in polarity at said short-circuited ends and reflected back along said delay elements, switch means connected to equally spaced points along said delay elements for representing any of a first group of digits in said arithmetic operations by a corresponding number of units of delay of said pulse of said one polarity and for representing any of a second group of digits by a corresponding number of units of delay of said pulse of inverted polarity, and means for determining the total delay undergone by said pulses in each of said groups of delay elements for determining the outcome of said arithmetic operations.

11. Apparatus for performing addition comprising a plurality of groups of electric delay elements having a plurality of units of delay therein, each of said groups representing a different numerical order in said addition, each of said delay elements being short-circuited at one end thereof, means for supplying electrical pulses of one polarity to each of said groups of delay elements at the ends thereof opposite to said short-circuited ends, whereby said pulses traverse each of said delay elements with said one polarity and are inverted in polarity at said short-circuited ends and reflected back along said delay elements, means for delaying said pulses in each of said groups of delay elements by amounts proportional to the sum of the augend and addend digits for the one of said orders corresponding to that group of delay elements, and means for determining the total delay undergone by said pulses in each of said groups of delay elements for determining the sum of the augend and addend digits for each of said orders.

12. Apparatus for performing arithmetic operations comprising a plurality of groups of electrical delay elements having a plurality of units of delay therein, each of said groups representing a different numerical order in said arithmetic operations, each of said delay elements being short-circuited at one end thereof, means for supplying electrical pulses of one polarity to each of said groups of delay elements at the ends thereof opposite to said short-circuited ends, whereby said pulses traverse each of said delay elements with said one polarity and are inverted in polarity at said short-circuited ends and reflected back along said delay elements, switch means connected to equally spaced points along said delay elements for representing any of the digits from 1 to 4 in said arithmetic operations by a corresponding number of units of delay of said pulse of said one polarity and for representing any of the digits from 5 to 9 by a corresponding number of units of delay of said pulse of inverted polarity, and means for determining the total delay undergone by said pulses in each of said groups of delay elements for determining the outcome of said arithmetic operations.

13. Apparatus for performing subtraction comprising a plurality of groups of electrical delay elements, each of said groups representing a different numerical order in said subtraction and each of said groups having a minuend section and a subtrahend section, each of said delay elements having one end thereof short-circuited, means for supplying a clock pulse of one polarity in parallel to each of said groups of delay elements at the ends thereof opposite to said short-circuited ends, whereby said pulse traverses each of said delay elements with said one polarity and is inverted in polarity at said short-circuited ends and reflected back along said delay elements, means for delaying said pulse in each of said minuend sections by amounts proportional to the nines complement of the minuend digit for each of said orders, means for additionally delaying said pulse in each of said subtrahend sections by amounts proportional to the subtrahend digit for each of said orders, means for determining the sum of delays undergone by said pulse in each of said orders, and means for indicating said sum in each of said orders in terms of the nines complement of said sum to indicate the difference between the minuend and the subtrahend digits for each of said orders.

14. Apparatus for performing subtraction comprising a plurality of groups of electrical delay elements, each of said groups representing a different numerical order in said subtraction and each of said groups having a minuend section and a subtrahend section, each of said delay elements having one end thereof short-circuited, means for supplying a clock pulse of one polarity in parallel to said groups of delay elements at the ends thereof opposite to said short-circuited ends, whereby said pulse traverses each of said delay elements with said one polarity and is inverted in polarity at said short-circuited ends and reflected back along said delay elements, means for delaying said pulse in each of said minuend sections by amounts proportional to the nines complement of the minuend digit for each of said orders, means for additionally delaying said pulse in each of said subtrahend sections by amounts proportional to the subtrahend digit for each of said orders, borrow delay means for each of said groups of delay elements for introducing into each of said orders an additional delay representing a borrow, first borrow control means responsive to a subtrahend digit larger than a minuend digit in a given order for energizing said borrow delay means to introduce a borrow delay into the order following said given order, second borrow control means responsive jointly to a difference of zero in a given order and a borrow from the order preceding said given order for energizing said borrow delay means to introduce a borrow delay into the order following said given order, means for determining the sum of the delays undergone by said pulse in each of said orders, and means for indicating said sum for each of said orders in terms of the nines complement of said sum to indicate the difference between the minuend and the subtrahend for each of said orders.

15. Apparatus for electrically performing addition comprising a plurality of groups of electrical delay elements, each of said groups representing a different numerical order in said addition, each of said delay elements having one end thereof short-circuited, means for supplying a clock pulse of one polarity in parallel to said groups of delay elements at the ends thereof opposite to said short-circuited ends, whereby said pulse traverses each of said delay elements with said one polarity and is inverted in polarity at said short-circuited ends and reflected back along said delay elements, means for delaying said pulse in said elements by amounts proportional to the sums of the numbers involved in said addition, means for determining the total delay undergone by said pulse in each of said orders for determining said sums, carry delay means for each of said groups of delay elements for introducing into each of said orders an additional delay representing a carry, first carry control means responsive to a sum greater than nine in a given order for energizing said carry delay means to introduce a carry delay into the order following said given order, and second carry control means responsive jointly to a sum of nine in a given order and a carry from the order preceding said given order for energizing said carry delay means to introduce a carry delay into the order following said given order.

16. Apparatus for electrically performing addition comprising a plurality of groups of electrical delay elements, each of said groups representing a different numerical order in said addition and each of said groups having an augend section and an addend section, each of said delay elements having one end thereof short-circuited, means for supplying a clock pulse of one polarity in parallel to said groups of delay elements at the ends thereof opposite to said short-circuited ends, whereby said pulse traverses said delay elements with said one polarity and is inverted in polarity at said short-circuited ends and reflected back down said delay elements, means for delaying said pulse in each of said augend sections by amounts proportional to the augend digits for each of said orders, means for additionally delaying said pulse in each of said addend sections by amounts proportional to the addend digits for each of said orders, carry delay means for each of said groups of delay elements for introducing into each of said orders an additional delay representing a carry, first carry control means responsive to a sum greater than nine in a given order for energizing said carry delay means to introduce a carry delay into the order following said given order, second carry control means responsive jointly to a sum of nine in a given order and a carry from the order preceding said given order for energizing said carry delay means to introduce a carry delay into the order following said given order, and means for determining the total delay undergone by said pulse in each of said orders for determining said sums.

References Cited in the file of this patent

UNITED STATES PATENTS 2,822,131 Aigrain ---------------- Feb. 4, 1958

UNITED STATES PATENT OFFICE

CERTIFICATE OF CORRECTION

Patent No. 2,920,823 January 12, 1960

John H. Gallichotte

It is hereby certified that error appears in the printed specification of the above numbered patent requiring correction and that the said Letters Patent should read as corrected below.

Column 5, line 72, for "appearing at tap 38-3:6 in" read -- pulse is --; column 12, line 51, after "62c" insert -- to --; column 15, line 31, for "46-1:8" read -- 45-1:8 --.

Signed and sealed this 12th day of July 1960.

(SEAL)
Attest:

KARL H. AXLINE
Attesting Officer

ROBERT C. WATSON
Commissioner of Patents